US008864318B2

(12) United States Patent
Terashima et al.

(10) Patent No.: US 8,864,318 B2
(45) Date of Patent: Oct. 21, 2014

(54) PROJECTOR WITH ALTERNATING POWER LEVELS

(75) Inventors: Tetsuo Terashima, Azumino (JP);
Tatsuhiko Nobori, Matsumoto (JP);
Shunsuke Hino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 183 days.

(21) Appl. No.: 13/566,359

(22) Filed: Aug. 3, 2012

(65) Prior Publication Data

US 2013/0088693 A1    Apr. 11, 2013

(30) Foreign Application Priority Data

Oct. 6, 2011    (JP) ................................. 2011-221967

(51) Int. Cl.
*G03B 21/00* (2006.01)
*H04N 9/31* (2006.01)
*G09G 3/00* (2006.01)
*H04N 13/04* (2006.01)
*H05B 41/288* (2006.01)
*G03B 21/20* (2006.01)
*G09G 3/20* (2006.01)
*H05B 41/292* (2006.01)
*G09G 3/34* (2006.01)

(52) U.S. Cl.
CPC ............ *G03B 21/206* (2013.01); *H04N 9/3155* (2013.01); *G09G 3/003* (2013.01); *H04N 13/0438* (2013.01); *H05B 41/2887* (2013.01); *H04N 9/31* (2013.01); *H04N 9/3105* (2013.01); *G09G 3/20* (2013.01); *H04N 13/0422* (2013.01); *G03B 21/2026* (2013.01); *H05B 41/2928* (2013.01); *H04N 13/0459* (2013.01); *G09G 3/3406* (2013.01); *Y02B 20/208* (2013.01)

USPC ............................................................ 353/85

(58) Field of Classification Search
CPC ........... G03B 21/2026; G03B 21/2053; G03B 21/206; H05B 41/2824; H05B 41/2827; H05B 41/2828; H05B 41/3927; H02M 3/158
USPC ............ 353/7, 52, 85, 94, 119, 122; 315/276, 315/289, 207; 348/7, 55, 743–747; 349/5–9
See application file for complete search history.

(56) References Cited

U.S. PATENT DOCUMENTS 7,909,473 B2 * 3/2011 Deppe ............................. 353/85
8,264,170 B2 * 9/2012 Terashima et al. ............ 315/308
(Continued)

FOREIGN PATENT DOCUMENTS

JP      A-2003-102030      4/2003
JP      A-2007-41535       2/2007
(Continued)

*Primary Examiner* — Sultan Chowdhury
(74) *Attorney, Agent, or Firm* — Oliff PLC

(57) ABSTRACT

A projector includes: a discharge lamp; a discharge lamp drive section which supplies an electric power to the discharge lamp; and a control section which controls the discharge lamp drive section, wherein a period interposed between the switching timings which are temporally adjacent to each other starts in a first period and ends in a second period, wherein the control section controls, on the basis of a correlation pattern which indicates the correlation between a first electric power and a second electric power, the discharge lamp drive section to supply the first electric power to the discharge lamp in the first period and to supply the second electric power to the discharge lamp in the second period, and wherein the correlation pattern includes a pattern in which as the second electric power is decreased, the ratio of the first electric power to the second electric power is increased.

10 Claims, 20 Drawing Sheets

(56) References Cited

U.S. PATENT DOCUMENTS

| | | |
|---|---|---|
| 8,624,493 B2 * | 1/2014 | Asmussen et al. ............ 313/635 |
| 2005/0286272 A1 * | 12/2005 | Iwamoto et al. ........... 363/21.01 |
| 2007/0018951 A1 | 1/2007 | Nobori et al. |
| 2007/0076175 A1 | 4/2007 | Nakagawa et al. |
| 2008/0122380 A1 * | 5/2008 | Matsui et al. ................. 315/276 |
| 2009/0206763 A1 * | 8/2009 | Shannon et al. ............. 315/224 |
| 2009/0278469 A1 * | 11/2009 | Yamada et al. ............... 315/291 |
| 2010/0091098 A1 * | 4/2010 | Yoshifuji et al. ................ 348/54 |
| 2010/0253920 A1 | 10/2010 | Miyazawa |
| 2012/0026468 A1 | 2/2012 | Terashima et al. |
| 2012/0038755 A1 | 2/2012 | Sato et al. |
| 2012/0044466 A1 | 2/2012 | Sato et al. |

FOREIGN PATENT DOCUMENTS

| | | |
|---|---|---|
| JP | A-2008-103091 | 5/2008 |
| JP | A-2009-237302 | 10/2009 |
| JP | A-2010-243543 | 10/2010 |
| JP | A-2012-32504 | 2/2012 |
| JP | A-2012-39497 | 2/2012 |
| JP | A-2012-42707 | 3/2012 |

* cited by examiner

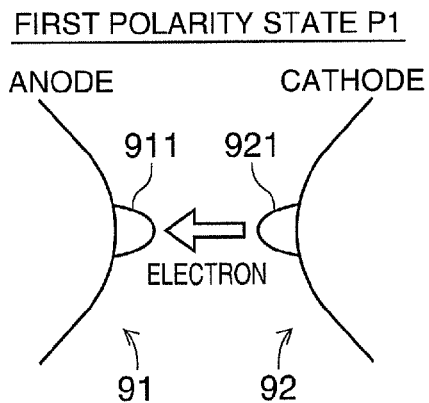
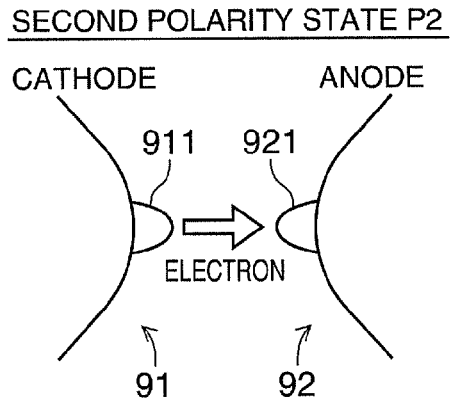
FIG. 6A     FIG. 6B
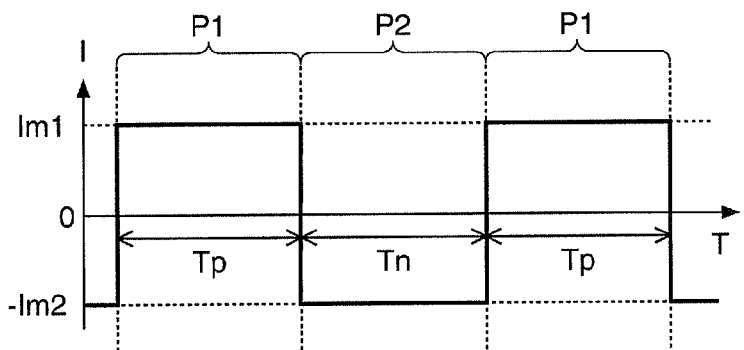
FIG. 6C
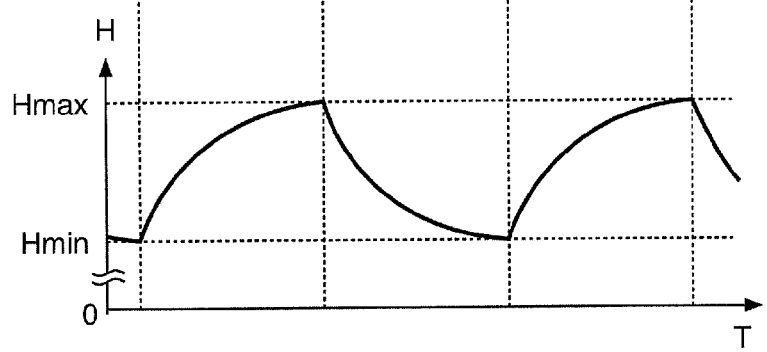
FIG. 6D

| ELAPSED TIME [MINUTE] | CORRELATION PATTERN |
|---|---|
| LESS THAN 1 | A1 |
| 1 OR MORE AND LESS THAN 5 | B1 |
| 5 OR MORE | C1 |

FIG. 17A

| ELAPSED TIME [MINUTE] | CORRELATION PATTERN |
|---|---|
| LESS THAN 1 | A2 |
| 1 OR MORE AND LESS THAN 5 | B2 |
| 5 OR MORE | C2 |

FIG. 17B

| ELAPSED TIME [MINUTE] | CORRELATION PATTERN |
|---|---|
| LESS THAN 1 | A3 |
| 1 OR MORE AND LESS THAN 5 | B3 |
| 5 OR MORE | C3 |

FIG. 17C

PROJECTOR WITH ALTERNATING POWER LEVELS

BACKGROUND

1. Technical Field

The present invention relates to a projector.

2. Related Art

A projector which uses a discharge lamp such as a high pressure mercury lamp or a metal halide lamp has been put into practical use. In such a projector, for example, a dimming technique as disclosed in JP-A-2007-41535 is used. As one of dimming techniques, there is a technique of performing dimming by controlling electric power supplied to a discharge lamp (hereinafter, referred to as "lamp dimming").

Further, in recent years, a projector which uses a discharge lamp such as a high pressure mercury lamp or a metal halide lamp and outputs a stereoscopic image has been put into practical use.

As an example of a method of outputting the stereoscopic image, there is a method of switching and alternately outputting a right-eye image and a left-eye image (for example, an active shutter glasses type such as "XPAND beyond cinema (trademark of X6D Limited)"). In this method, the right-eye image is viewed with the right eye and the left-eye image is viewed with the left eye using active shutter glasses or the like which are synchronized with an image signal, and thus, the image is viewed stereoscopically using the parallax between the left eye and the right eye.

If a state where the electric power supplied to the discharge lamp is decreased due to lamp dimming is continued for a long time, the temperature of the discharge lamp is decreased, and thus condensation of metal (mercury or the like) in a light emitting tube of the discharge lamp may progress. If the condensation of metal (mercury or the like) progresses, in order to increase luminance again, time is necessary for evaporating the metal (mercury or the like) again. As a result, there is a problem that time is taken for increasing luminance (luminance responsiveness of the projector is deteriorated).

Further, if the temperature of the discharge lamp is decreased, an electrode of the discharge lamp cannot be sufficiently melted, and the electrode may be deformed. If the electrode is deformed, an arc starting point may be deviated from an original position, and thus, flicker easily occurs. If flicker occurs, the brightness of an image projected during usage of the projector is changed.

SUMMARY

An advantage of some aspects of the invention is to provide a projector in which the occurrence of flickering is suppressed and the luminance responsiveness is increased.

An aspect of the invention is directed to a projector which switches and alternately outputs a first image and a second image at a predetermined timing, including: a discharge lamp; a discharge lamp drive section which supplies an electric power for driving the discharge lamp to the discharge lamp; and a control section which controls the discharge lamp drive section, wherein a period interposed between the switching timings which are temporally adjacent to each other starts in a first period and ends in a second period, wherein the control section controls, on the basis of a correlation pattern which is a pattern indicating the correlation between a first electric power and a second electric power, the discharge lamp drive section to supply the first electric power to the discharge lamp in the first period and to supply the second electric power to the discharge lamp in the second period, and wherein the correlation pattern is a pattern in which as the second electric power is decreased, the ratio of the first electric power to the second electric power is increased.

In the projector which switches and alternately outputs the first image and the second image, there is a usage state in which the image is blocked by active shutter glasses or the like and is not shown to a user immediately after the first image is switched to the second image. In this aspect of the invention, since the correlation pattern which is a pattern indicating the correlation between the first electric power and the second electric power is a pattern in which the ratio of the first electric power to the second electric power is increased as the second electric power is decreased, it is possible to suppress the temperature of the discharge lamp from being decreased in the first period when the image is not shown to the user. Accordingly, it is possible to realize a projector in which the occurrence of flickering is suppressed and the luminance responsiveness is increased.

Further, as the correlation pattern is a pattern in which the ratio of the first electric power to the second electric power is increased as the second electric power is decreased, it is possible to enlarge a range in which the second electric power can be obtained. Accordingly, it is possible to realize a projector which is capable of increasing the difference between the maximum luminance and the minimum luminance.

In the projector, the correlation pattern may be a pattern in which in a case where the second electric power is a first reference value or less, the first electric power is a constant value regardless of the second electric power.

Accordingly, since the first electric power is not less than the constant value, it is possible to further suppress the temperature of the discharge lamp from being decreased. Accordingly, it is possible to realize a projector in which the occurrence of flickering is suppressed and the luminance responsiveness is increased.

In the projector, the correlation pattern may be a pattern in which in a case where the second electric power is a second reference value or less, as the second electric power is decreased, the first electric power is increased.

Since the first electric power is increased as the second electric power is decreased, it is possible to further suppress the temperature of the discharge lamp from being decreased. Accordingly, it is possible to realize a projector in which the occurrence of flickering is suppressed and the luminance responsiveness is increased.

In the projector, the projector may further include a state detecting section which detects a state of deterioration of the discharge lamp, and as the state of deterioration proceeds, the control section may change the correlation pattern in a case where the second electric power is a third reference value or less so that the inclination of the first electric power to the second electric power is decreased.

For example, the state detecting section may detect drive voltage of the discharge lamp, a temporal change in the drive voltage of the discharge lamp, the light amount of the discharge lamp, a temporal change in the light amount of the discharge lamp, an accumulated lighting time of the discharge lamp or the like, as a value indicating the degree of deterioration.

If the state of deterioration of the discharge lamp proceeds, flicker easily occurs. Since the correlation pattern is changed so that the inclination of the first electric power to the second electric power is decreased as the state of deterioration of the discharge lamp proceeds, in a case where the state of deterioration of the discharge lamp proceeds, it is possible to further suppress the temperature of the discharge lamp from being decreased. Accordingly, it is possible to suppress the occurrence of flickering. Further, in a case where the state of deterioration of the discharge lamp does not proceed, since the first electric power is decreased, it is possible to realize a projector in which power consumption is suppressed.

The projector may further include a state detecting section which detects a state of deterioration of the discharge lamp, and as the state of deterioration proceeds, the control section may increase the first reference value or the second reference value.

If the state of deterioration of the discharge lamp proceeds, flicker easily occurs. Since the first reference value or the second reference value is increased as the state of deterioration of the discharge lamp proceeds, in a case where the state of deterioration of the discharge lamp proceeds, it is possible to further suppress the temperature of the discharge lamp from being decreased. Accordingly, it is possible to suppress the occurrence of flickering. Further, in a case where the state of deterioration of the discharge lamp does not proceed, since the first electric power is decreased, it is possible to realize a projector in which the power consumption is suppressed.

In the projector described above, as the time when the second electric power is continued with a fourth reference value or less becomes long, the control section may change the correlation pattern in a case where the second electric power is less than a third reference value so that the inclination of the first electric power to the second electric power is decreased.

As a state where the temperature of the discharge lamp is low is continued for a long time, luminance responsiveness of the discharge lamp is deteriorated. As the time when the second electric power is continued with the fourth reference value or less becomes long, since the correlation pattern is changed so that the inclination of the first electric power to the second electric power is decreased, it is possible to suppress the state where the temperature of the discharge lamp is low from being continued for a long time. Accordingly, it is possible to realize a projector having high luminance responsiveness. Further, in a case where the time when the second electric power is continued with the fourth reference value or less is short, it is possible to decrease the first electric power, and thus, it is possible to realize a projector in which the power consumption is suppressed.

In the projector, the correlation pattern may be a pattern in which in a case where the second electric power is a fifth reference value or less, the second electric power is smaller than the first electric power.

Accordingly, it is possible to make the second electric power smaller than an average power over a lighting period of the discharge lamp, and to project a darker image. Accordingly, it is possible to realize a projector which is capable of increasing the difference between the maximum luminance and the minimum luminance.

Another aspect of the invention is directed to a projector which repeats a first period when a first image is output and a second period when a second image is output, including: a discharge lamp; a discharge lamp drive section which supplies an electric power for driving the discharge lamp to the discharge lamp; and a control section which controls the discharge lamp drive section, wherein the first image is an image corresponding to black, wherein the control section controls, on the basis of a correlation pattern which is a pattern indicating the correlation between a first electric power and a second electric power, the discharge lamp drive section to supply the first electric power to the discharge lamp in the first period and to supply the second electric power to the discharge lamp in the second period, and wherein the correlation pattern is a pattern in which as the second electric power is decreased, the ratio of the first electric power to the second electric power is increased.

According to this aspect of the invention, since the correlation pattern which is a pattern indicating the correlation between the first electric power and the second electric power is a pattern in which the ratio of the first electric power to the second electric power is increased as the second electric power is decreased, it is possible to suppress the temperature of the discharge lamp from being decreased using the first period when the image corresponding to black is present. Accordingly, it is possible to realize a projector in which the occurrence of flickering is suppressed and the luminance responsiveness is increased.

BRIEF DESCRIPTION OF THE DRAWINGS

The invention will be described with reference to the accompanying drawings, wherein like numbers reference like elements.

FIGS. 6A to 6D are diagrams illustrating the relationship between the polarity of electric current supplied to a discharge lamp and the temperature of an electrode.

FIG. 153 is a graph illustrating a correlation pattern corresponding to FIG. 15A.

FIGS. 17A to 17C are tables illustrating the correspondence between a time when a second power is continued with a fourth reference value or less and a correlation pattern.

DESCRIPTION OF EXEMPLARY EMBODIMENTS

Hereinafter, preferred embodiments of the invention will be described in detail with reference to the accompanying drawings. The embodiments described below do not unsuitably limit content of the invention disclosed in the appended claims. Further, all configurations described below are not limited as essential components of the invention.

1. Projector According to Embodiment

Figure 1:
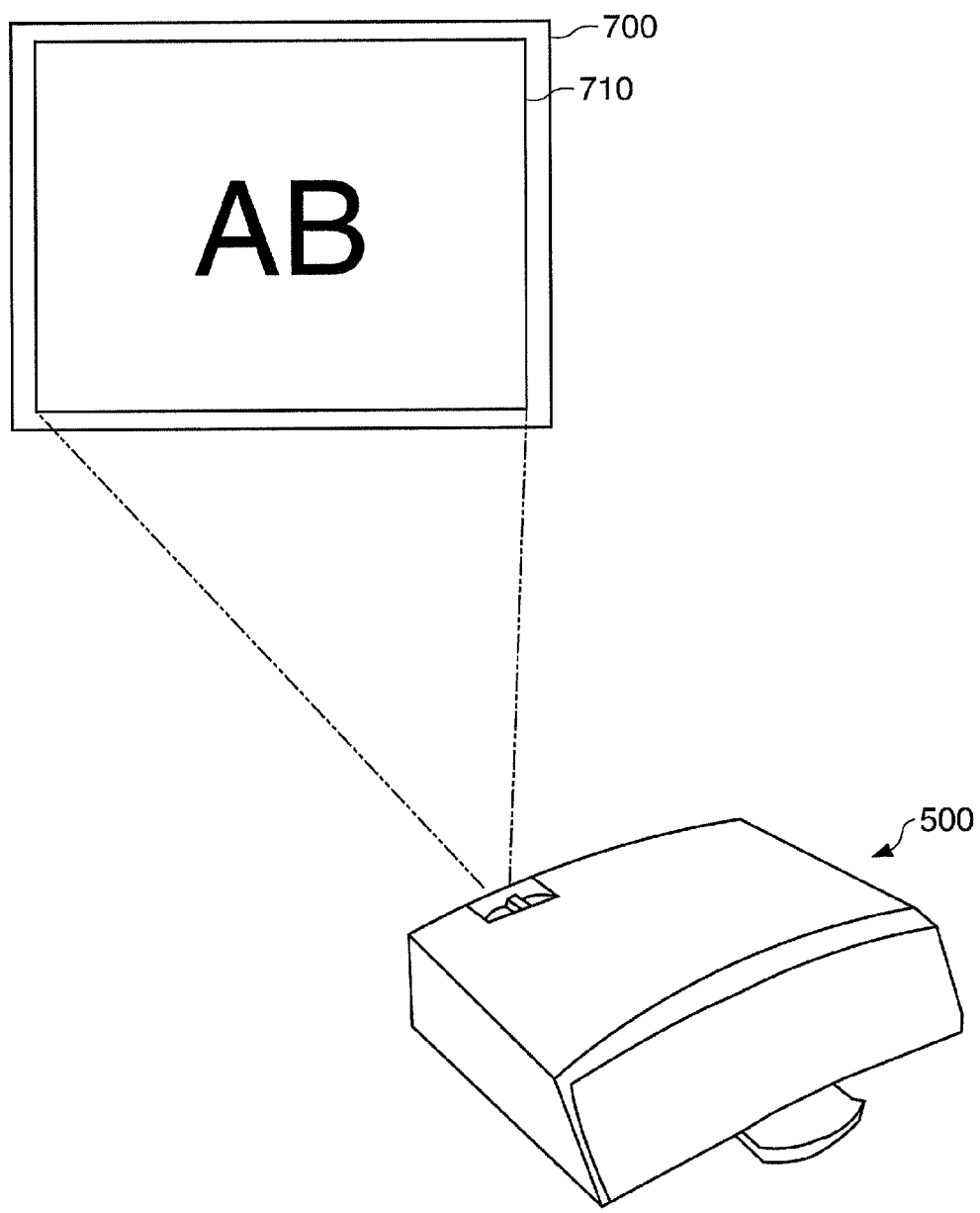
FIG. 1 is a perspective view illustrating a projector according to an embodiment of the invention.

FIG. 1 is a perspective view illustrating a projector 500 according to an embodiment of the invention. In an example shown in FIG. 1, the projector 500 projects an image 710 onto a screen 700.

1-1. Optical System of Projector According to the Present Embodiment

Figure 2:
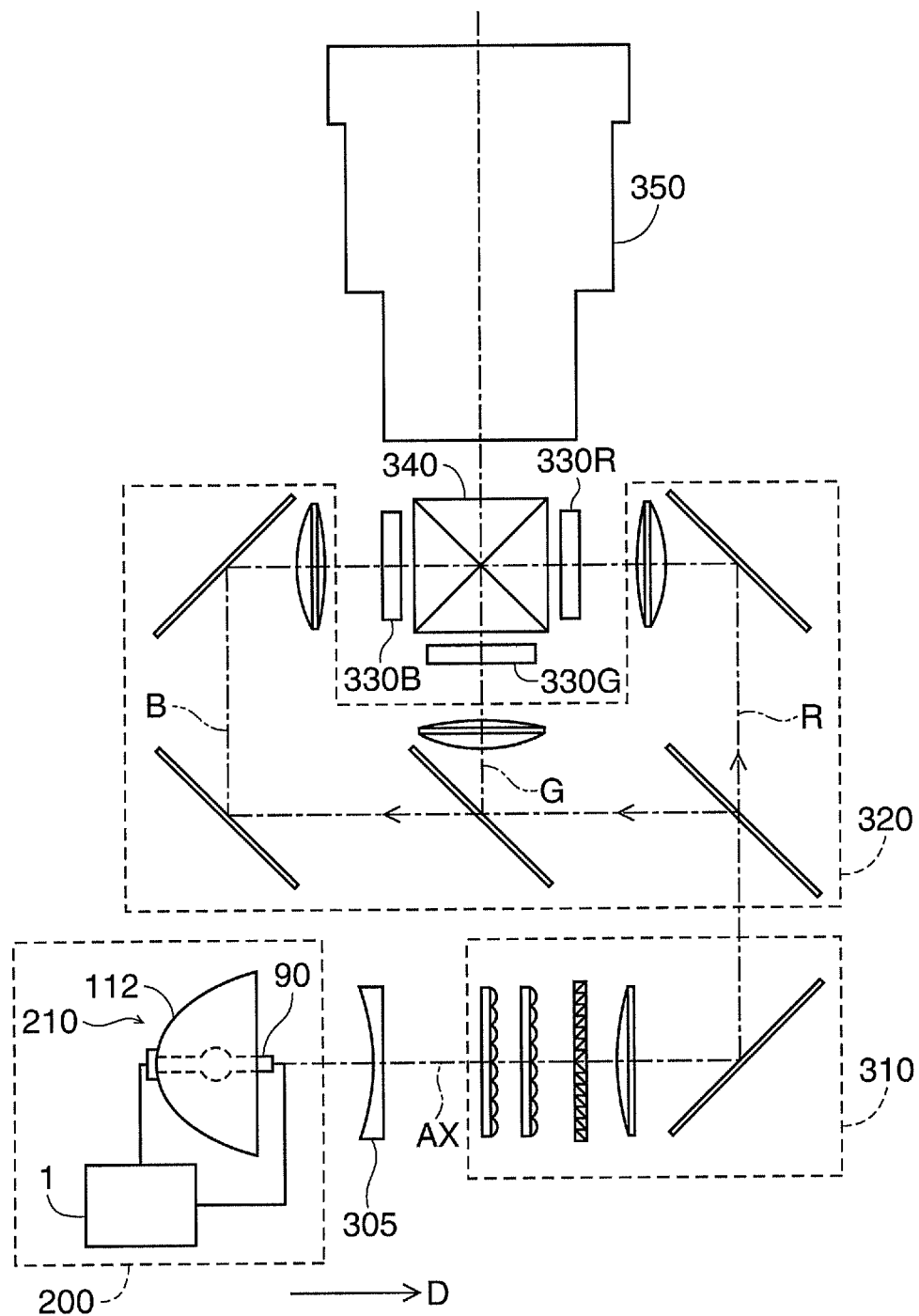
FIG. 2 is a diagram illustrating an optical system of the projector according to the present embodiment.

FIG. 2 is a diagram illustrating an optical system of the projector 500 according to the present embodiment. The projector 500 includes a light source device 200, a collimating lens 305, an illumination optical system 310, a color separation optical system 320, three liquid crystal light valves 330R, 330G and 330B, a cross dichroic prism 340, and a projection optical system 350.

The light source device 200 includes a discharge lamp lighting device 1 and a light source unit 210. The light source unit 210 includes a main reflection mirror 112, a sub reflection mirror 50 (which will be described later in detail), and a discharge lamp 90. The discharge lamp lighting device 1 supplies electric power to the discharge lamp 90 to light the discharge lamp 90. The main reflection mirror 112 reflects light emitted from the discharge lamp 90 in an irradiation direction D. The irradiation direction D is parallel to an optical axis AX. The light from the light source unit 210 passes through the collimating lens 305 and is incident on the illumination optical system 310. The collimating lens 305 collimates the light from the light source unit 210.

The illumination optical system 310 uniformizes the illuminance of the light from the light source device 200 in the liquid crystal light valves 330R, 330G and 330B. Further, the illumination optical system 310 aligns a polarization direction of the light from the light source device 200 into a single direction. This is performed to effectively use the light from the light source device 200 in the liquid crystal light valves 330R, 330G and 330B. The light in which the illuminance distribution and the polarization direction are adjusted is incident on the color separation optical system 320. The color separation optical system 320 separates the incident light into lights of three colors of red (R), green (G) and B (blue). The lights of three colors are respectively modulated by the liquid crystal light valves 330R, 330G and 330B which correspond to respective colors. The liquid crystal light valves 330R, 330G and 330B include liquid crystal panels 560R, 560G and 560B, and a polarization plate which is disposed on a light incident side and a light exiting side of each of liquid crystal panels 560R, 560G and 560B. The modulated lights of three colors are synthesized by the cross dichroic prism 340. The synthesized light is incident on the projection optical system 350. The projection optical system 350 projects the incident light onto the screen 700. Thus, the image 710 is displayed on the screen 700.

As a configuration of each of the collimating lens 305, the illumination optical system 310, the color separation optical system 320, the cross dichroic prism 340 and the projection optical system 350, various known configurations may be employed.

Figure 3:
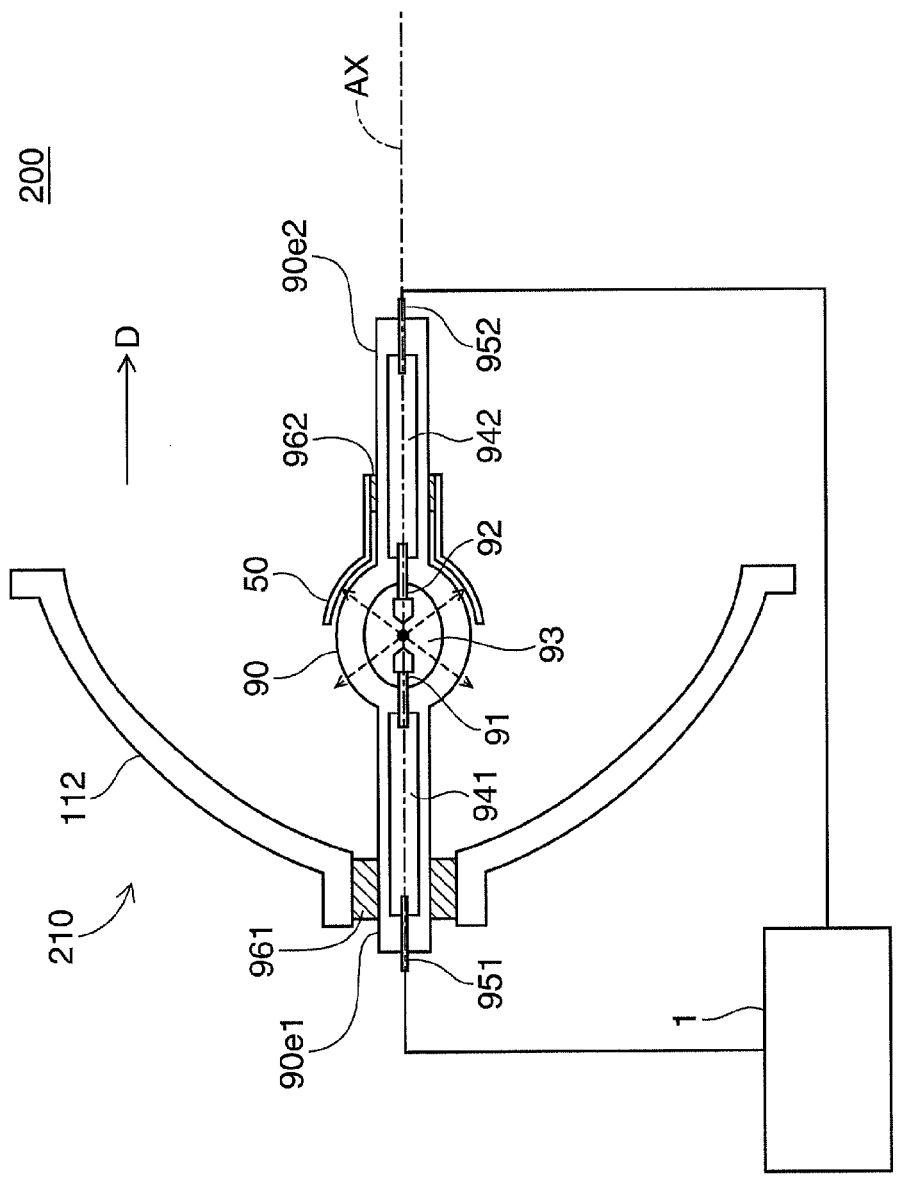
FIG. 3 is a diagram illustrating a configuration of a light source device.

FIG. 3 is a diagram illustrating a configuration of the light source device 200. The light source device 200 includes the light source unit 210 and the discharge lamp lighting device 1. In the figure, a cross-sectional view of the light source unit 210 is shown. The light source unit 210 includes the main reflection mirror 112, the sub reflection mirror 50 and the discharge lamp 90.

The shape of the discharge lamp 90 is a rod shape which extends along the irradiation direction D from a first end part 90e1 thereof to a second end part 90e2 thereof. The material of the discharge lamp 90 is a light transmissive material such as quartz glass. The central part of the discharge lamp 90 expands in a spherical shape, and a discharge space 93 is formed therein. In the discharge space 93, gas which is a discharge medium which includes a rare gas, a metal halogen compound and the like is sealed.

Further, a first electrode 91 and a second electrode 92 protrude from the discharge lamp 90 in the discharge space 93. The first electrode 91 is disposed on the side of the first end part 90e1 in the discharge space 93, and the second electrode 92 is disposed on the side of the second end part 90e2 in the discharge space 93. The shapes of the first electrode 91 and the second electrode 92 are a rod shape which extends along the optical axis AX. An electrode tip end part (also, referred to as a "discharge end") of the first electrode 91 and an electrode tip end part of the second electrode 92 are spaced by a predetermined distance to face each other in the discharge space 93. The material of the first electrode 91 and the second electrode 92 is metal such as tungsten.

A first terminal 951 is installed in the first end part 90e1 of the discharge lamp 90. The first terminal 951 and the first electrode 91 are electrically connected to each other by a conductive member 941 which passes through the inside of the discharge lamp 90. Similarly, a second terminal 952 is installed in the second end part 90e2 of the discharge lamp 90. The second terminal 952 and the second electrode 92 are electrically connected to each other by a conductive member 942 which passes through the inside of the discharge lamp 90. The material of the first terminal 951 and the second terminal 952 is metal such as tungsten. Further, as the conductive members 941 and 942, for example, a molybdenum foil is used.

The first terminal 951 and the second terminal 952 are connected to the discharge lamp lighting device 1. The discharge lamp lighting device 1 supplies alternating current to the first terminal 951 and the second terminal 952. As a result, arc discharge occurs between the first electrode 91 and the second electrode 92. Light (discharge light) generated by the arc discharge is emitted in all directions from the discharge position as indicated by an arrow of a broken line.

The main reflection mirror 112 is fixed to the first end part 90e1 of the discharge lamp 90 by a fixing member 961. The shape of a reflection surface (surface on the side of the discharge lamp 90) of the main reflection mirror 112 is a revolving elliptical shape. The main reflection mirror 112 reflects the discharge light along the irradiation direction D. The shape of the reflection surface of the main reflection mirror 112 is not limited to the revolving elliptical shape, and various shapes which are able to reflect the discharge light in the irradiation direction D may be employed. For example, a revolving parabola shape maybe employed. In this case, the main reflection mirror 112 is capable of converting the discharge light into light which is approximately parallel to the optical axis AX. Accordingly, it is possible to omit the collimating lens 305.

The sub reflection mirror 50 is fixed to the side of the second end part 90e2 of the discharge lamp 90 by a fixing member 962. The shape of a reflection surface (surface on the side of the discharge light 90) of the sub reflection mirror 50 is a spherical shape which surrounds the discharge space 93 on the side of the second end part 90e2. The sub reflection mirror 50 reflects the discharge light toward the main reflection mirror 112. Thus, it is possible to increase usage efficiency of the light emitted from the discharge space 93.

As the material of the fixing members 961 and 962, an arbitrary heat resistance material (for example, inorganic adhesive) which stands heat generation of the discharge lamp 90 may be employed. Further, as a method of fixing the arrangement of the main reflection mirror 112 and the sub reflection mirror 50, and the discharge lamp 90 is not limited to a method of fixing the main reflection mirror 112 and the sub reflection mirror 50 to the discharge lamp 90, and an arbitrary method may be employed. For example, the discharge lamp 90 and the main reflection mirror 112 maybe independently fixed to a housing (not shown) of the projector 500. This is similarly applied to the sub reflection mirror 50.

1-2. Circuit Configuration of Projector According to the Present Embodiment

Figure 4:
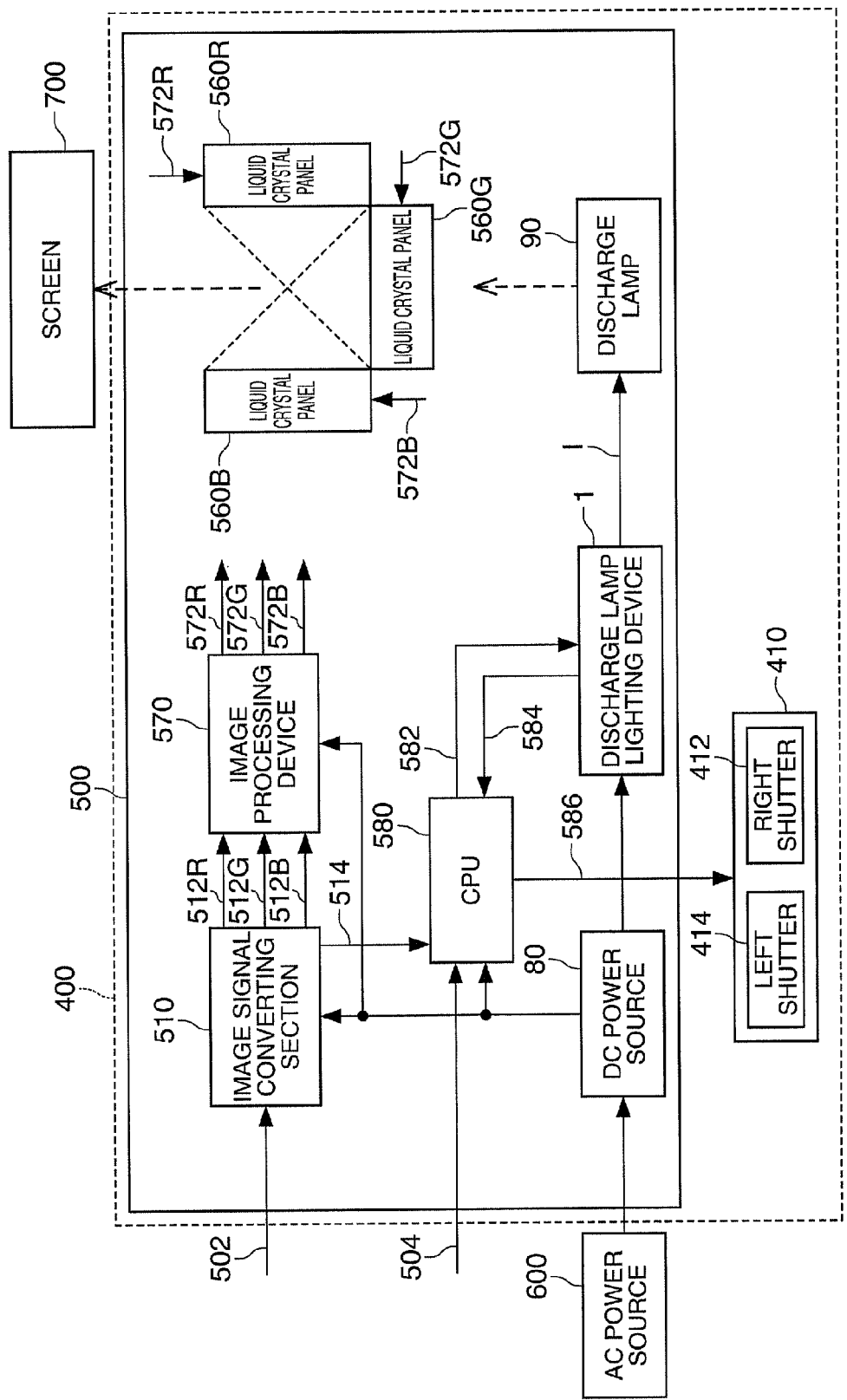
FIG. 4 is a circuit diagram illustrating a circuit configuration of the projector according to the present embodiment.

FIG. 4 is a circuit diagram illustrating a circuit configuration of the projector 500 according to the present embodiment. The projector 500 may include an image signal converting section 510, a DC power source 80, an image processing device 570, and a CPU (Central Processing unit) 580, in addition to the optical system described above. Further, the projector 500 may be configured as a projector system 400 which includes the projector 500 and active shutter glasses 410.

The image signal converting section 510 converts an image signal 502 (luminance—color difference signals, analog RGB signals and the like) input from the outside into digital RGB signals of a predetermined word length to generate image signals 512R, 512G and 512B, and then supplies the result to the image processing device 570. Further, the image signal converting section 510 may output a sync signal 514 to the CPU 580 on the basis of the image signal 502. The sync signal 514 may include information relating to a switching timing of a first image and a second image or information relating to luminance corresponding to the image signal 502.

The image processing device 570 performs image processing for each of three image signals 512R, 512G and 512B, and supplies drive signals 572R, 572G and 572B for respectively driving the liquid crystal panels 560R, 560G and 5603 to the liquid crystal panels 560R, 560G and 560B. On the basis of the drive signals 572R, 572G and 572B input to the liquid crystal panels 560R, 560G and 560B, the image 710 is projected onto the screen 700 by the optical system described with reference to FIG. 2.

The DC power source 80 converts AC voltage supplied from an external AC power source 600 into a constant DC voltage, and supplies the DC voltage to the image signal converting section 510 which is on the secondary side of a transformer (which is not shown, but is included in the DC power source 80), the image processing device 570 and the discharge lamp lighting device 1 which is on the first side of the transformer.

The discharge lamp lighting device 1 generates high voltage between the electrodes of the discharge lamp 90 at the time of start-up and causes insulation breakdown to form a discharge path, and then, the discharge lamp 90 supplies an electric current I for maintaining the discharge of the discharge lamp 90 (drive current of the discharge lamp 90).

The liquid crystal panels 560R, 560G and 560B modulate the luminance of the color light incident on each liquid crystal panel through the optical system described above, on the basis of each of the drive signals 572R, 572G and 572B.

The CPU 580 controls an operation from the start of lighting of the projector 500 to extinguishing thereof. For example, the CPU 580 may output a lighting command, an extinguishing command and information relating to electric power for driving the discharge lamp 90 to the discharge lamp lighting device 1 through a communication signal 582. Further, the CPU 580 may receive lighting information indicating a lighting state of the discharge lamp 90 from the discharge lamp lighting device 1 through a communication signal 584.

Further, the CPU 580 may receive an operation signal 504 based on a user's operation. The operation signal 504 may include information relating to the brightness of an image 710 projected to the screen 700 by the projector 500.

Further, the CPU 580 may output a control signal 586 for controlling the active shutter glasses 410 in synchronization with the image signal 502 through wired or wireless communication means, on the basis of a sync signal 514 output from the image signal converting section 510, to the active shutter glasses 410.

The active shutter glasses 410 may include a right shutter 412 and a left shutter 414. The right shutter 412 and the left shutter 414 are controlled to be opened or closed on the basis of the control signal 586. In a case where a user wears the active shutter glasses 410, as the right shutter 412 is closed, a visual field on the right eye side may be blocked. Further, in a case where the user wears the active shutter glasses 410, as the left shutter 414 is closed, a visual field on the left eye side may be blocked. The right shutter 412 and the left shutter 414 may include a liquid crystal shutter, for example.

1-3. Configuration of Discharge Lamp Lighting Device

Figure 5:
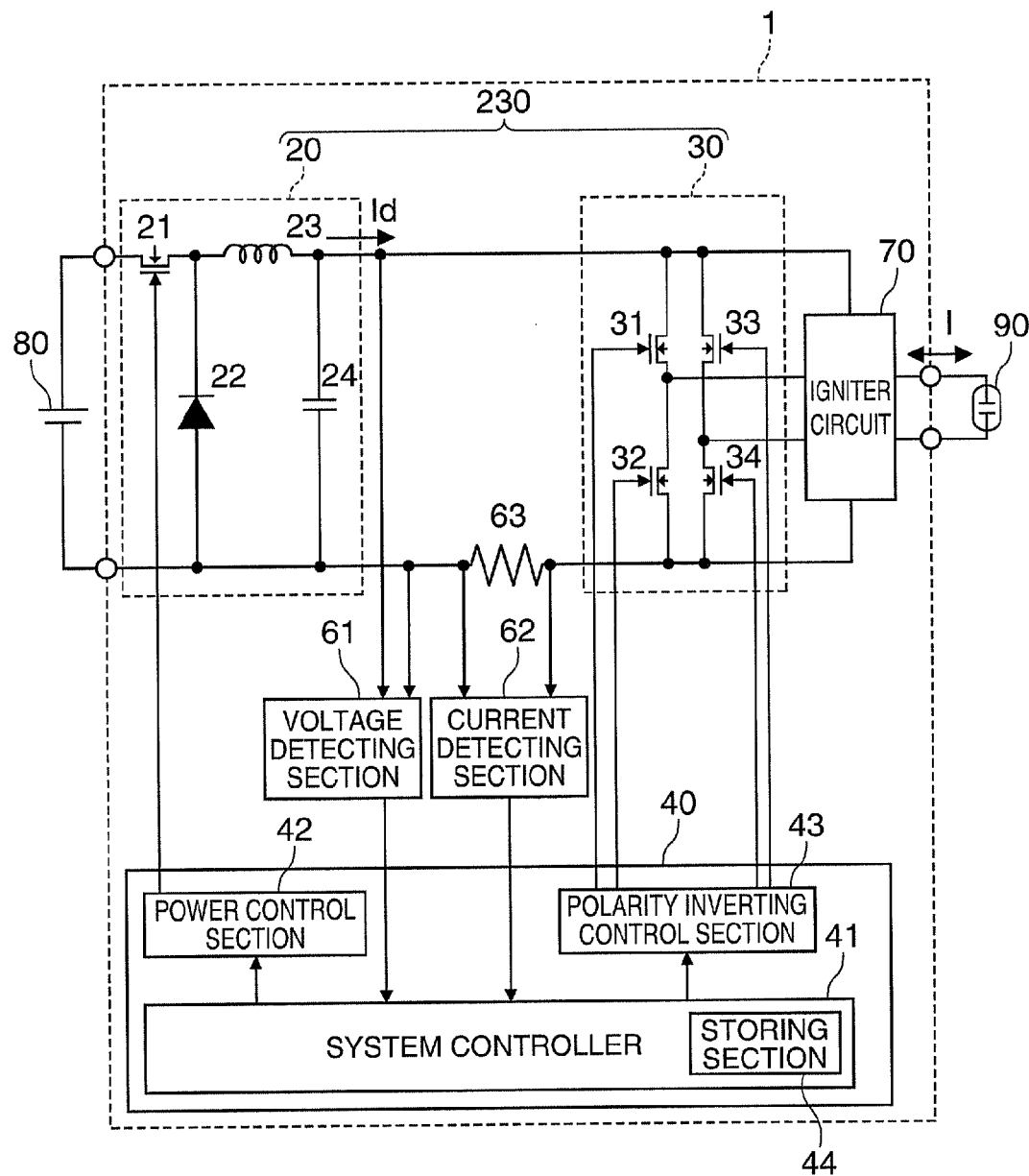
FIG. 5 is a circuit diagram illustrating a circuit configuration of a discharge lamp lighting device.

FIG. 5 is a circuit diagram illustrating a circuit configuration of the discharge lamp lighting device 1.

The discharge lamp lighting device 1 includes a power controlling circuit 20. The power controlling circuit 20 generates electric power to be supplied to the discharge lamp 90. In the present embodiment, the power controlling circuit 20 includes a down chopper circuit which lowers voltage input from the DC power source 80 and outputs direct current Id.

The power controlling circuit 20 may include a switch element 21, a diode 22, a coil 23 and a capacitor 24. The switch element 21 may include a transistor, for example. In the present embodiment, one end of the switch element 21 is connected to the positive voltage side of the DC power source 80, and the other end thereof is connected to a cathode terminal of the diode 22 and one end of the coil 23. Further, one end of the capacitor 24 is connected to the other end of the coil 23, and the other end of the capacitor 24 is connected to an anode terminal of the diode 22 and the negative voltage side of the DC power source 80. A power control signal is input to a control terminal of the switch element 21 from a control section 40 (which will be described later) to control ON/OFF of the switch element 21. A PWM (Pulse Width Modulation) control signal, for example, may be used as the power control signal.

Here, if the switch element 21 is turned on, electric current flows in the coil 23, and energy is accumulated in the coil 23. Then, if the switch element 21 is turned off, the energy accumulated in the coil 23 is discharged from a path passing the capacitor 24 and the diode 22. As a result, the direct current Id based on the ratio to the time when the switch element 21 is turned on is generated.

The discharge lamp lighting device 1 includes a polarity inverting circuit 30. The polarity inverting circuit 30 receives the direct current Id output from the power controlling circuit 20 and performs polarity inversion at a predetermined timing to generate electric current I which is direct current which is continued for a controlled time or alternating current which has an arbitrary frequency. In the present embodiment, the polarity inverting circuit 30 includes an inverter bridge circuit (full bridge circuit).

The polarity inverting circuit 30 includes a first switch element 31, a second switch element 32, a third switch element 33 and a fourth switch element 34 which include a transistor or the like, and is configured by connecting the first switch element 31 and the second switch element 32 which are connected in series and the third switch element 33 and the fourth switch element 34 which are connected in series, in parallel with each other. Polarity inverting control signals are respectively input to control terminals of the first switch element 31, the second switch element 32, the third switch element 33 and the fourth switch element 34 from the control section 40, to control ON/OFF operations of the first switch element 31, the second switch element 32, the third switch element 33 and the fourth switch element 34.

By alternately repeating the ON/OFF operations of the first switch element 31 and the fourth switch element 34, and the ON/OFF operations of the second switch element 32 and the third switch element 33, the polarity inverting circuit 30 alternately inverts the polarity of the direct current Id output from the power controlling circuit 20, and generates and outputs the electric current I which is direct current which is continued for the controlled time or alternating current which has a controlled frequency, from a common connection point of the first switch element 31 and the second switch element 32 and a common connection point of the third switch element 33 and the fourth switch element 34.

That is, when the first switch element 31 and the fourth switch element 34 are turned on, the second switch element 32 and the third switch element 33 are controlled to be turned off, and when the first switch element 31 and the fourth switch element 34 are turned off, the second switch element 32 and the third switch element 33 are controlled to be turned on. Accordingly, when the first switch element 31 and the fourth switch element 34 are turned on, the electric current I which flows in the order of the first switch element 31, the discharge lamp 90 and the fourth switch element 34 from one end of the capacitor 24, is generated. Further, when the second switch element 32 and the third switch element 33 are turned on, the electric current I which flows in the order of the third switch element 33, the discharge lamp 90 and the second switch element 32 from one end of the capacitor 24, is generated.

In the present embodiment, the power controlling circuit 20 and the polarity inverting circuit 30 correspond, in combination, to a discharge drive section 230. That is, the discharge drive section 230 supplies the electric current I which drives the discharge lamp 90 to the discharge lamp 90 to supply electric power to the discharge lamp 90.

The discharge lamp lighting device 1 includes the control section 40. The control section 40 controls the power controlling circuit 20 and the polarity inverting circuit 30 to control the electric power supplied to the discharge lamp 90, a holding time when the electric current I is continued with the same polarity, an electric current value and the frequency of the electric current I, and the like. The control section 40 controls the electric current value of the direct current Id output to the power controlling circuit 20, to thereby perform a current control for controlling the electric current I supplied to the discharge lamp 90. Further, according to a polarity inverting timing of the electric current I with respect to the polarity inverting circuit 30, the control section 40 performs a polarity inverting control for controlling the holding time when the electric current I is continued with the same polarity, the frequency of the electric current I, and the like.

The configuration of the control section 40 is not particularly limitative, but in the present embodiment, the control section 40 includes a system controller 41, a power control section 42 and a polarity inverting control section 43. A part or the entirety of the control section 40 may be configured by a semiconductor integrated circuit.

The system controller 41 controls the power control section 42 and the polarity inverting control section 43 to control the power controlling circuit 20 and the polarity inverting circuit 30. The system controller 41 may control the power control section 42 and the polarity inverting control section 43, on the basis of drive voltage Vla of the discharge lamp 90 detected by a voltage detecting section 61 (which will be described later) and the electric current I supplied to the discharge lamp 90 detected by a current detecting section 62 (which will be described later).

In the present embodiment, the system controller 41 includes a storing section 44. The storing section 44 may be installed independently of the system controller 41.

The system controller 41 may control the power controlling circuit 20 and the polarity inverting circuit 30, on the basis of information stored in the storing section 44. In the storing section 44, for example, information relating to drive conditions such as a holding time when the electric current I is continued with the same polarity, an electric current value, frequency, waveform, and modulation pattern of the electric current I, and a correlation pattern between a first power and a second power (which will be later described in detail), may be stored.

The power control section 42 outputs a power control signal to the power controlling circuit 20 on the basis of the control signal from the system controller 41 to control the power controlling circuit 20.

The polarity inverting control section 43 outputs a polarity inverting control signal to the polarity inverting circuit 30 on the basis of the control signal from the system controller 41 to control the polarity inverting circuit 30.

The control section 40 may be realized by an exclusive circuit to perform the above-mentioned controls or various controls to be described later, but for example, the CPU may function as a computer by executing a control program stored in the storing section 44 or the like to perform various controls.

Further, in an example shown in FIG. 5, the control section 40 is configured as a part of the discharge lamp lighting device 1, but the CPU 580 may perform a part or all of the functions of the control section 40.

The discharge lamp lighting device 1 may include the voltage detecting section 61. The voltage detecting section 61 detects the drive voltage Vla of the discharge lamp 90, and then outputs information about the drive voltage to the control section 40. The voltage detecting section 61 corresponds to a state detecting section in the invention. That is, the state detecting section (voltage detecting section 61) detects the drive voltage Vla as a value indicating the degree of the state of deterioration of the discharge lamp 90.

If the state of deterioration of the first electrode 91 and the second electrode 92 of the discharge lamp 90 proceeds, the distance (inter-electrode distance) between the first electrode 91 and the second electrode 92 is increased. If the interelectrode distance is increased, the drive voltage Vla is increased. That is, the drive voltage Vla is increased as the state of deterioration of the discharge lamp 90 proceeds.

The state detecting section may detect temporal change in the drive voltage Vla of the discharge lamp 90, the amount of light of the discharge lamp 90, temporal change in the light amount of the discharge lamp 90, accumulative lighting time of the discharge lamp 90, and the like, for example, instead of the drive voltage Vla of the discharge lamp 90 or in addition to the drive voltage Vla of the discharge lamp 90, as a value indicating the degree of the state of deterioration.

The discharge lamp lighting device 1 may include the current detecting section 62. The current detecting section 62 detects the electric current I supplied to the discharge lamp 90 and outputs the drive current information to the control section 40. In the present embodiment, the current detecting section 62 detects voltage generated in a resistor 63 which is connected in series to the discharge lamp 90, to detect the electric current I supplied to the discharge lamp 90.

Further, the voltage detecting section 61 and the current detecting section 62 may be respectively realized by an exclusive circuit to perform the above-described detection, but for example, the CPU may also function as a computer by executing a control program stored in a storing section (not shown) or the like to perform the above-described detection.

Further, the control section 40, the voltage detecting section 61 and the current detecting section 62 may be independently configured, or may be integrally configured by one CPU.

The discharge lamp lighting device 1 may include an igniter circuit 70. The igniter circuit 70 is operated only when the discharge lamp 90 starts lighting, and causes insulation-breakdown between the electrodes (between the first electrode 91 and the second electrode 92) of the discharge lamp 90 when the discharge lamp 90 starts lighting and supplies a high voltage (voltage higher than voltage when the discharge lamp 90 is normally lighted) necessary for forming a discharge path between the electrodes (between the first electrode 91 and the second electrode 92) of the discharge lamp 90. In the present embodiment, the igniter circuit 70 is connected to the discharge lamp 90 in parallel.

1-4. Relationship between Polarity of Drive Current and Temperature of Electrode FIGS. 6A to 6D are diagrams illustrating the relationship between the polarity of the electric current I supplied to the discharge lamp 90 and the temperature of the electrode. FIGS. 6A and 6B show operation states of the first electrode 91 and the second electrode 92. In the figure, the tip end parts of the first electrode 91 and the second electrode 92 are shown. Protrusions 911 and 921 are respectively formed at the tip ends of the first electrode 91 and the second electrode 92. Discharge occurring between the first electrode 91 and the second electrode 92 mainly occurs between the protrusion 911 and the protrusion 921. In the examples shown in FIGS. 6A and 6B, compared with a case where the protrusions are not formed, it is possible to prevent movement of the discharge position (arc position) in the first electrode 91 and the second electrode 92. However, such a protrusion may be omitted.

FIG. 6A shows a first polarity state P1 in which the first electrode 91 is operated as the anode and the second electrode 92 is operated as the cathode. In the first polarity state P1, electrons move to the first electrode 91 (anode) from the second electrode 92 (cathode) by discharge. The electrons are discharged from the cathode (second electrode 92). The electrons discharged from the cathode (second electrode 92) collide with the tip end of the anode (first electrode 91). Heat is generated by the collision, and thus, the temperature of the tip end (protrusion 911) of the anode (first electrode 91) is increased.

FIG. 6B shows a second polarity state P2 in which the first electrode 91 is operated as the cathode and the second electrode 92 is operated as the anode. In the second polarity state P2, contrary to the first polarity state P1, electrons move to the second electrode 92 from the first electrode 91. As a result, the temperature of the tip end (protrusion 921) of the second electrode 92 is increased.

In this way, the temperature of the anode is easily increased compared with the cathode. Here, a state in which the temperature of one electrode is higher than the temperature of the other electrode (a state in which the temperature of the other electrode is lower than the temperature of one electrode) is continued may cause various problems. For example, the tip end of the high temperature electrode is excessively melted, unintentional electrode deformation may occur. As a result, the length of arc may be deviated from an appropriate value. Further, for example, in a case where the tip end of the low temperature electrode is insufficiently melted, minute concaves and convexes generated at the tip end may remain without being melted. Consequently, a so-called arc jump may occur (arc position moves without stability).

As a technology of suppressing such a problem, an AC driving which supplies alternating current in which the polarity of each electrode is repeatedly switched to the discharge lamp 90 as the electric current I, maybe used. FIG. 6C is a timing chart illustrating an example of the electric current I supplied to the discharge lamp 90. The horizontal axis represents time T, and the vertical axis represents an electric current value of the electric current I. The electric current I shows electric current which flows in the discharge lamp 90. A positive value represents the first polarity state P1, and a negative value represents the second polarity state P2. In the example shown in FIG. 6C, square wave alternating current is used as the electric current I. Further, in the example shown in FIG. 6C, the first polarity state P1 and the second polarity state P2 are alternately repeated. Here, a first polarity segment Tp represents the time when the first polarity state P1 is continued, and a second polarity segment Tn represents the time when the second polarity state P2 is continued. Further, in the example shown in FIG. 6C, an average current value of the first polarity segment Tp is Im1, and an average current value of the second polarity segment Tn is −Im2. Further, the frequency of the electric current I suitable for the driving of the discharge lamp 90 may be experimentally determined according to characteristics of the discharge lamp 90 (for example, a value in the range of 30 Hz to 1 kHz is used). The other values Im1, −Im2, Tp and Tn may be similarly experimentally determined.

FIG. 6D is a timing chart illustrating temperature change of the first electrode 91. The horizontal axis represents time T, and the vertical axis represents temperature H. In the first polarity state P1, the temperature H of the first electrode 91 is increased, and in the second polarity state P2, the temperature H of the first electrode 91 is decreased. Further, since the first polarity state P1 and the second polarity state P2 are repeated, the temperature H is periodically changed between a minimum value Hmin and a maximum value Hmax. Although not shown, the temperature of the second electrode 92 is changed in a phase opposite to the temperature H of the first electrode 91. That is, in the first polarity state P1, the temperature of the second electrode 92 is decreased, and in the second polarity state P2, the temperature of the second electrode 92 is increased.

In the first polarity state P1, since the tip end of the first electrode 91 (protrusion 911) is melted, the tip end of the first electrode 91 (protrusion 911) becomes smooth. Thus, it is possible to suppress movement of the discharge position in the first electrode 91. Further, since the temperature of the tip end of the second electrode 92 (protrusion 921) is decreased, excessive melting of the second electrode 92 (protrusion 921) is suppressed. Thus, it is possible to suppress unintentional electrode deformation. In the second polarity state P2, the roles of the first electrode 91 and the second electrode 92 are reversed. Accordingly, by repeating the first polarity state P1 and the second polarity state P2, it is possible to suppress the problem in each of the first electrode 91 and the second electrode 92.

Here, in a case where the waveform of the electric current I is symmetric, that is, the waveform of the electric current I satisfies a condition that "|Im1|=|−Im2| and Tp=Tn", conditions of the supplied power are the same between the first electrode 91 and the second electrode 92. Accordingly, it is inferred that, if thermal conditions (the ease with which temperature is increased or decreased) of the first electrode 91 and the second electrode 92 are the same, a temperature difference between the first electrode 91 and the second electrode 92 is reduced.

Further, if the electrode is excessively heated over a wide range (arc spot (hot spot on the electrode surface according to arc discharge) becomes large)), the shape of the electrode is deformed by the excessive melting. Contrarily, if the electrode becomes too cold, the tip end of the electrode may not be sufficiently melted, and the tip end is hardly smooth, that is, the tip end of the electrode is easily deformed.

Further, since if a state where the electric power supplied to the discharge lamp 90 is small is continued for a long time, the temperature of the discharge lamp 90 is decreased, condensation of metal (mercury or the like) in a light emitting tube of the discharge lamp 90 may progress. If the condensation of metal (mercury or the like) progresses, in order to increase the luminance again, time is necessary for vaporizing the metal (mercury or the like) again. Accordingly, if the state where the electric power supplied to the discharge lamp 90 is small is continued for a long time, it takes time to increase the luminance (luminance responsiveness of the projector is deteriorated).

1-5. Control Example of Electric Power According to the Present Embodiment

Next, a specific example of the electric power control in the projector 500 according to the present embodiment will be described.

1-5-1. First Period, Second Period and Switching Timing

Figure 7:
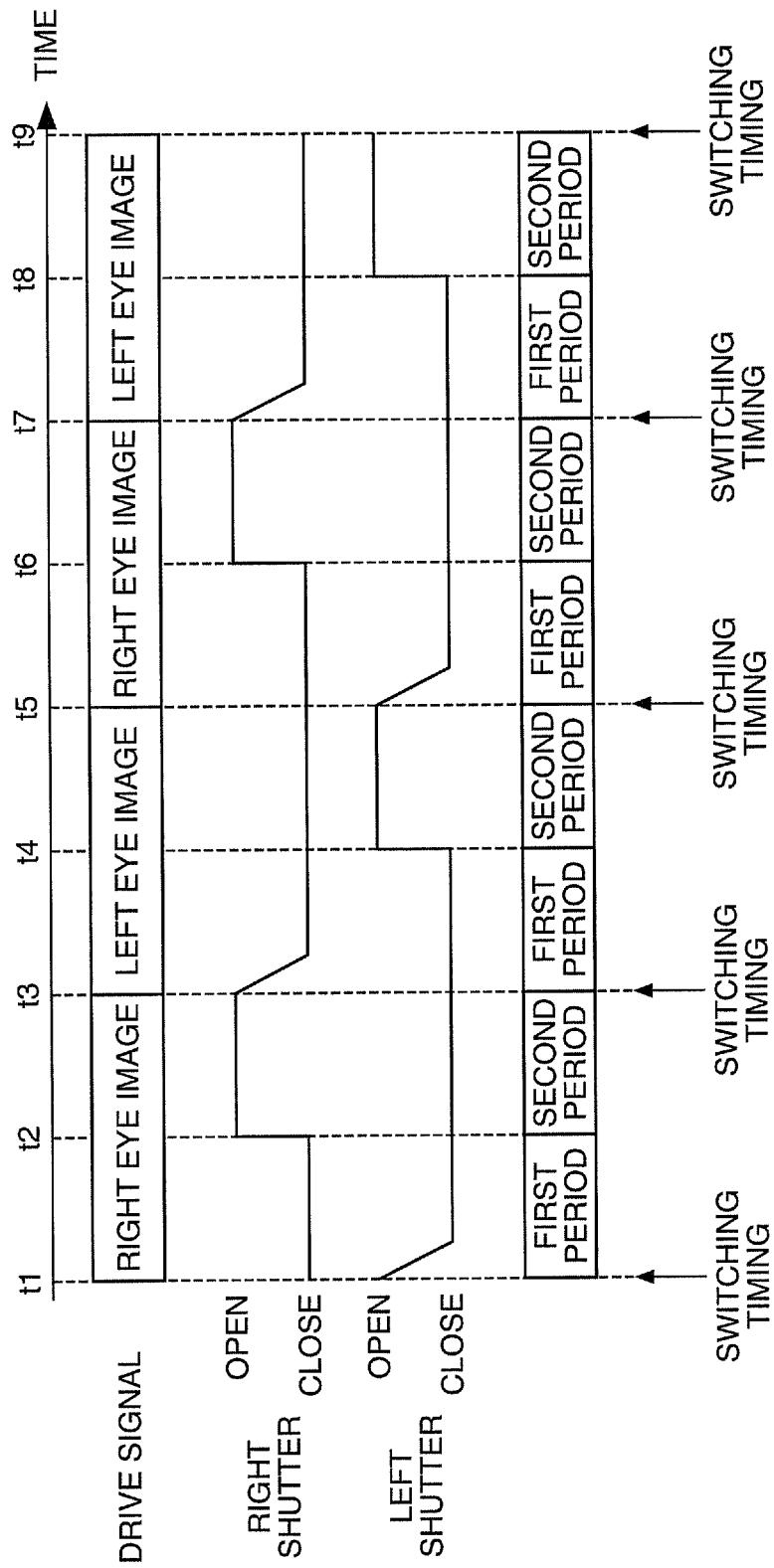
FIG. 7 is a diagram illustrating a first period, a second period and a switching timing.

FIG. 7 is a diagram illustrating a first period, a second period and a switching timing. In FIG. 7, content of the drive signals 572R, 572G and 572B, the opened and closed state of the right shutter 412, the opened and closed state of the left shutter 414, and the temporal relationship between the first period, the second period and the switching timing are shown sequentially from the top. In FIG. 7, the horizontal axis represents time. Hereinafter, an example in which an observer stereoscopically views a display image using a first image and a second image as a left eye image and a right eye image, respectively, will be described.

In the example shown in FIG. 7, the drive signals 572R, 572G and 572B are drive signals corresponding to the right eye image as the first image from a time t1 to a time t3, the left eye image as the second image from the time t3 to a time t5, the right eye image as the first image from the time t5 to a time t7, and the left eye image as the second image from the time t7 to a time t9. Accordingly, in the example shown in FIG. 7, the projector 500 switches and alternately outputs the right eye image as the first image and the left eye image as the second image, using the time t1, the time t3, the time t5, the time t7 and the time t9 as switching timings.

A period interposed between the switching timings which are temporally adjacent to each other starts in the first period and ends in the second period. In the example shown in FIG. 7, for example, a period interposed between the time t1 and the time t3 which are the switching timings starts in a first period from the time t1 to the time t2 and ends in a second period from the time t2 to the time t3. This is similarly applied to a period interposed between the time t3 and the time t5 which are the switching timings, a period interposed between the time t5 and the time t7 which are the switching timings, and a period interposed between the time t7 and the time t9 which are the switching timings. Further, in the example shown in FIG. 7, a case is shown in which the length of the first period and the length of the second period are the same. The length of the first period and the length of the second period may be appropriately set as necessary, respectively. Further, in addition to the first period and the second period, a third period may be present. In the third period, a control different from the power control in the first period and the second period (which will be described later) may be performed.

The right shutter 412 enters the opened state in at least a part of the period when the drive signals 572R, 572G and 572B corresponding to the right eye image as the first image are input to the liquid crystal panels 560R, 560G and 560B. In the example shown in FIG. 7, the right shutter 412 is in the closed state from the time t1 to the time t2, and then, is in the opened state from the time t2 to the time t3. Further, in the example shown in FIG. 7, in at least a part of the period when the drive signals 572R, 572G and 572B corresponding to the left eye image as the second image are input to the liquid crystal panels 560R, 560G and 560B, the right shutter 412 starts to be closed from the time t3, is completely closed between the time t3 and the time t4, and then, is in the closed state from the time t4 to the time t5. The change in the opened and closed states of the right shutter 412 between the time t5 and the time t9 is the same as the change in the opened and closed states between the time t1 and the time t5.

The left shutter 414 enters the opened state in at least a part of the period when the drive signals 572R, 572G and 572B corresponding to the left eye image as the second image are input to the liquid crystal panels 560R, 560G and 560B. In the example shown in FIG. 7, the left shutter 414 is in the closed state from the time t3 to the time t4, and then, is in the opened state from the time t4 to the time t5. Further, in the example shown in FIG. 7, in at least apart of the period when the drive signals 572R, 572G and 572B corresponding to the right eye image as the first image are input to the liquid crystal panels 560R, 560G and 560B, the left shutter 414 starts to be closed from the time t1, is completely closed between the time t1 and the time t2, and then, is in the closed state from the time t2 to the time t3. The change in the opened and closed states of the left shutter 414 between the time t5 and the time t9 is the same as the change in the opened and closed states between the time t1 and the time t5.

In the example shown in FIG. 7, in the period when the drive signals 572R, 572G and 572B corresponding to the right eye image as the first image are input to the liquid crystal panels 560R, 560G and 560B, the period when the right shutter 412 is closed corresponds to the first period, and the period when the right shutter 412 is opened corresponds to the second period. Further, in the example shown in FIG. 7, in the period when the drive signals 572R, 572G and 572B corresponding to the left eye image as the second image are input to the liquid crystal panels 560R, 560G and 560B, the period when the left shutter 414 is closed corresponds to the first period, and the period when the left shutter 414 is opened corresponds to the second period. Further, in the example shown in FIG. 7, in the first period, a period when all of the right shutter 412 and the left shutter 414 are closed is present.

1-5-2. Waveform Example of Electric Current I Supplied to Discharge Lamp 90

Figure 8A:
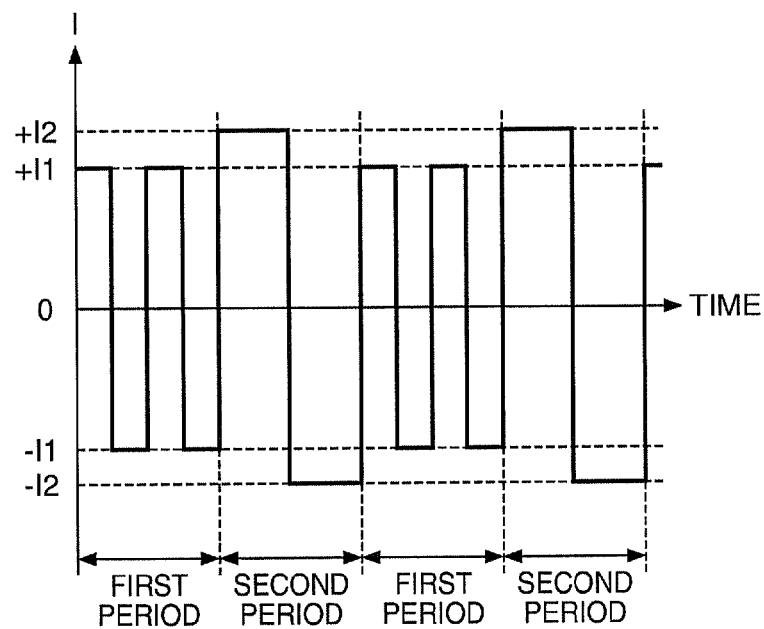
FIGS. 8A and 8B are timing charts illustrating waveform examples of electric current supplied to the discharge lamp.
Figure 8B:
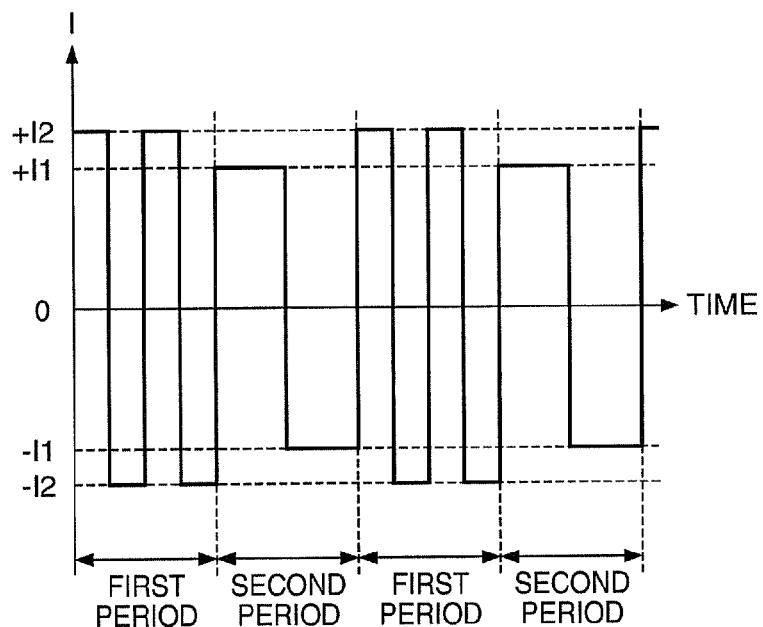

FIGS. 8A and 8B are timing charts illustrating waveform examples of the electric current I supplied to the discharge lamp 90. The horizontal axis in FIGS. 8A and 8B represents time, and the vertical axis represents an electric current value of the electric current I. Further, the electric current I in the case of the first polarity in which the first electrode 91 becomes the anode is represented as positive, and the electric current I in the case of the second polarity in which the second electrode 92 becomes the anode is represented as negative.

In the examples shown in FIG. 8A, the electric current I is square wave alternating current in which the electric current value ranges from −I1 to +I1 in the first period and square wave alternating current in which the electric current value ranges from −I2 to +I2 in the second period. In the example shown in FIG. 8B, the electric current I is square wave alternating current in which the electric current value ranges from −I2 to +I2 in the first period and square wave alternating current in which the electric current value ranges from −I1 to +I1 in the second period. In the examples shown in FIGS. 8A and 8B, the relationship of I1<I2 is established. Further, in the examples shown in FIGS. 8A and 8B, the frequency of the electric current I in the first period is higher than the frequency of the electric current I in the second period. Further, the frequency of the electric current I may be experimentally determined according to specification of the discharge lamp 90.

In the example shown in FIG. 8A, the absolute value (I1) of the electric current value of the electric current I in the first period is smaller than the absolute value (I2) of the electric current value of the electric current I in the second period. That is, a first power W1 which is electric power supplied to the discharge lamp 90 in the first period is smaller than a second power W2 which is electric power supplied to the discharge lamp 90 in the second period. In this case, the second power W2 is larger than the average power over the first period and the second period. Accordingly, an image projected from the projector 500 in the second period is brighter than an image projected with the average power over the first period and the second period.

In the example shown in FIG. 8B, the absolute value (I2) of the electric current value of the electric current I in the first period is larger than the absolute value (I1) of the electric current value of the electric current I in the second period. That is, the first power W1 which is electric power supplied to the discharge lamp 90 in the first period is larger than the second power W2 which is electric power supplied to the discharge lamp 90 in the second period. In this case, the second power W2 is smaller than the average power over the first period and the second period. Accordingly, the image projected from the projector 500 in the second period is darker than the image projected with the average power over the first period and the second period.

1-5-3. First Specific Example of Control Based on Correlation Pattern

The control section 40 of the projector 500 controls the discharge lamp drive section 230 so as to supply the first power W1 to the discharge lamp 90 in the first period, and controls the discharge lamp drive section 230 so as to supply the second power W2 to the discharge lamp 90 in the second period, on the basis of a correlation pattern which is a pattern indicating the correlation between the first power W1 and the second power W2.

Figure 9:
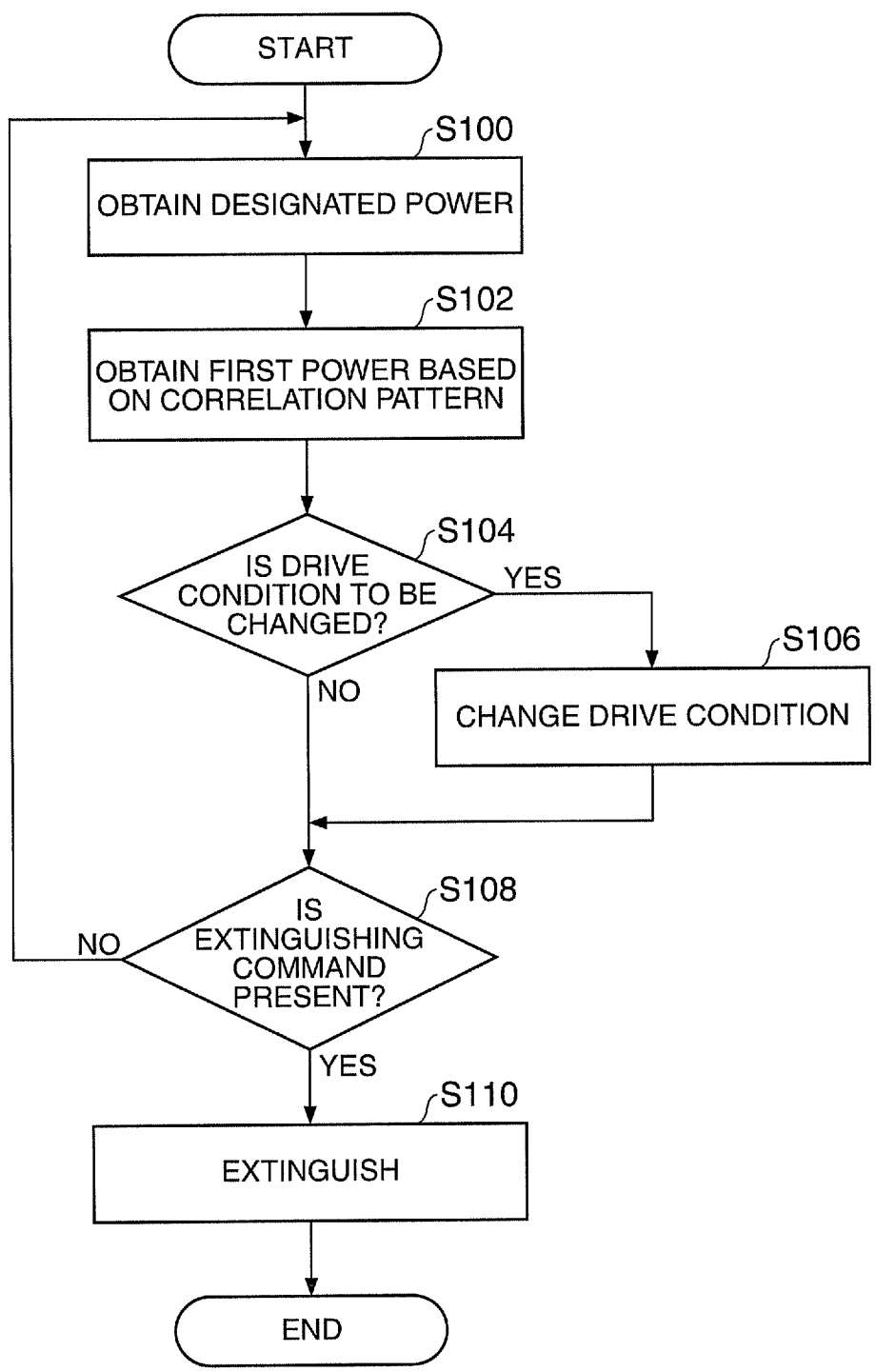
FIG. 9 is a flowchart illustrating a control example of the projector according to the present embodiment.

FIG. 9 is a flowchart illustrating a control example of the projector 500 according to the present embodiment. In the flowchart shown in FIG. 9, a control from the time when the discharge lamp 90 is stably lighted to the time of extinguishing thereof is shown.

Firstly, the control section 40 obtains a designated power (step S100). The designated power has the size of the second power W2 supplied to the discharge lamp 90 in the second period when an image is mainly shown to a user. The designated power may be designated by the CPU 580, on the basis of at least one of information relating to the luminance corresponding to the image signal 502 included in the sync signal 514 and information relating to the brightness of the image 710 projected onto the screen 700 by the projector 500 included in the operation signal 504.

After step S100, the control section 40 obtains the first power W1 corresponding to the designated power obtained in step S100 on the basis of the correlation pattern stored in the storing section 44 (step S102).

Figure 10A:
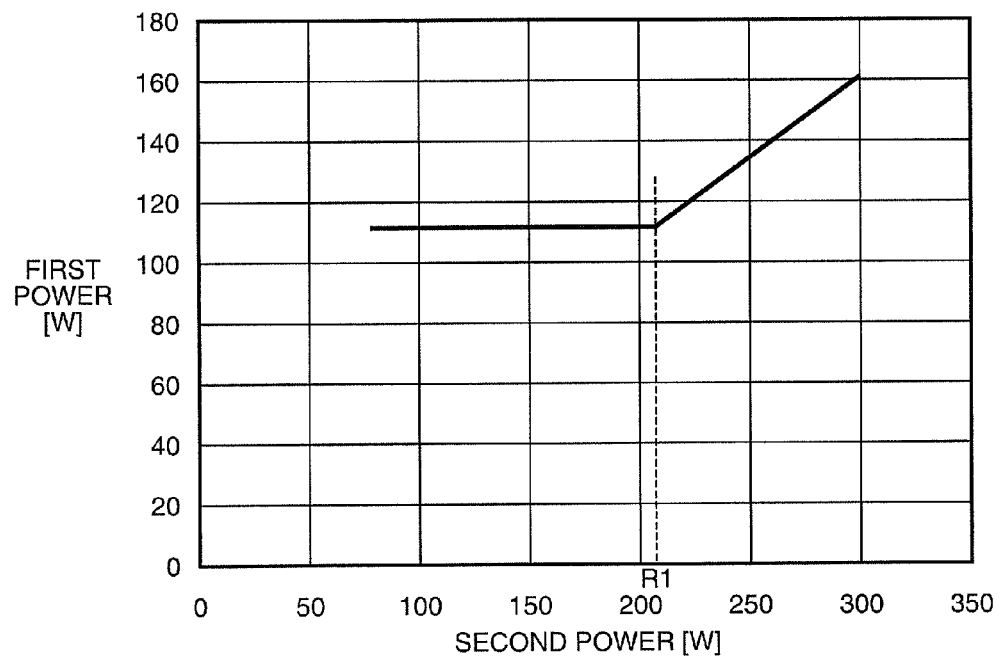
FIGS. 10A and 10B are graphs illustrating a correlation pattern in a first specific example of a control based on the correlation pattern.
Figure 10B:
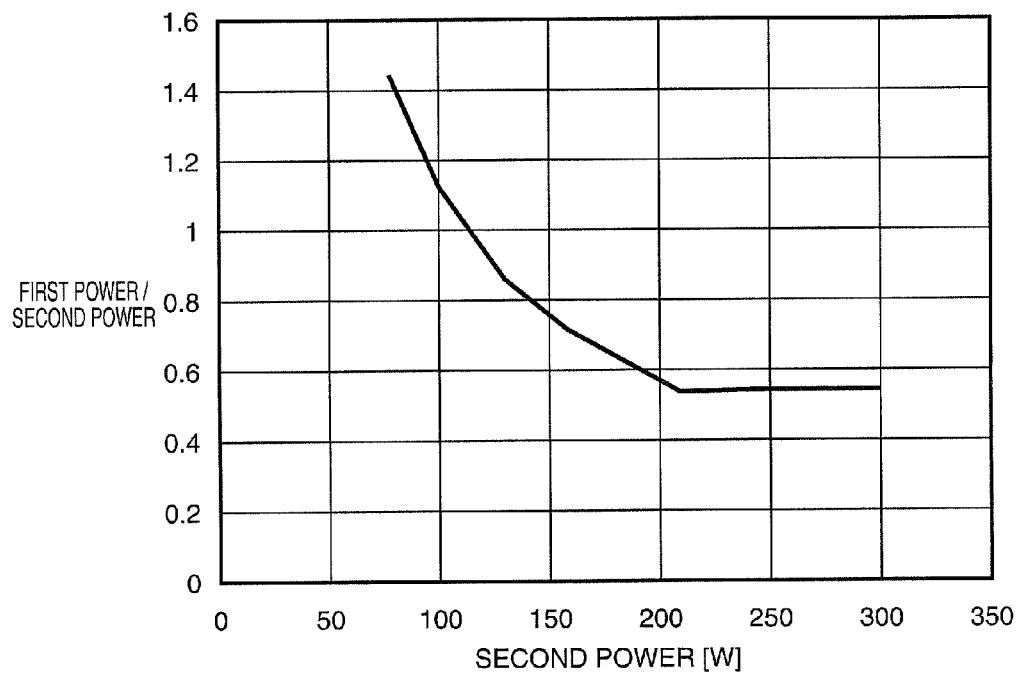

FIGS. 10A and 10B are graphs illustrating correlation patterns in the first specific example of the control based on the correlation pattern. The horizontal axis in FIG. 10A represents the second power W2, and the vertical axis represents the first power W1. The horizontal axis in FIG. 10B represents the second power W2, and the vertical axis represents the ratio of the first power W1 to the second power W2.

In the example shown in FIGS. 10A and 10B, the correlation pattern between the first power W1 and the second power W2 is a pattern in which as the second power W2 is decreased, the ratio of the first power W1 to the second power W2 is increased.

After the first power W1 is obtained in step S102 of FIG. 9, the control section 40 determines whether it is necessary to change the drive conditions (step S104). Here, the drive conditions are the first power W1 and the second power W2. In a case where it is determined that it is necessary to change the drive conditions (Yes in step S104), the control section 40 changes the drive conditions into the drive conditions selected in step 5102 and drives the discharge lamp 90 (step S106). In a case where it is determined that it is not necessary to change the drive conditions (No in step S104), the control section 40 continuously drives the discharge lamp 90 according to the previous drive conditions.

In the case of No in step S104 and after step S106, the control section 40 determines whether an extinguishing command of the discharge lamp 90 is present (step S108). In a case where it is determined that the extinguishing command is present (Yes in step S108), the control section 40 terminates (extinguishes) the lighting of the discharge lamp 90. In a case where it is determined that the extinguishing command is not present (No in step S108), the control section 40 repeats the control of step S100 to step S108 until the extinguishing command is present.

In the projector 500 which switches and alternately outputs the first image and the second image, there is a usage state in which an image immediately after the first image is switched to the second image is blocked by the active shutter glasses 410 or the like and is not shown to the user. According to the first specific example of the control based on the correlation pattern, since the correlation pattern which is a pattern indicating the correlation between the first power W1 and the second power W2 is a pattern in which as the second power W2 is decreased, the ratio of the first power W1 to the second power W2 is increased, it is possible to suppress the temperature of the discharge lamp 90 from being decreased, using the first period when the image is not shown to the user. Accordingly, it is possible to realize a projector in which the occurrence of flickering is suppressed and the luminance responsiveness is increased.

The correlation pattern between the first power W1 and the second power W2 may be a pattern in which in a case where the second power W2 is a first reference value R1 or less, the first power W1 becomes a constant value regardless of the second power W2. In the example shown in FIG. 10A, the correlation pattern between the first power W1 and the second power W2 is a pattern in which the first power W1 is a constant value of 112 [W] regardless of the second power W2 in a case where the second power W2 is the first reference value R1 or less. Further, in the example shown in FIG. 10A, the first reference value R1 is 208 [W].

Thus, since the first power W1 is not lower than the constant value, it is possible to further suppress the temperature of the discharge lamp 90 from being decreased. Accordingly, it is possible to realize a projector in which the occurrence of flickering is suppressed and the luminance responsiveness is increased.

1-5-4. Second Specific Example of Control Based on Correlation Pattern

The first specific example and the second specific example of the control based on the correlation pattern are the same in the flowchart of the control from the time when the discharge lamp 90 is stably lighted to the time of extinguishing thereof, as described with reference to FIG. 9, and are different from each other in the correlation pattern between the first power W1 and the second power W2 used in step S102. Accordingly, hereinafter, the correlation pattern between the first power W1 and the second power W2 used in step S102 will be mainly described.

Figure 11A:
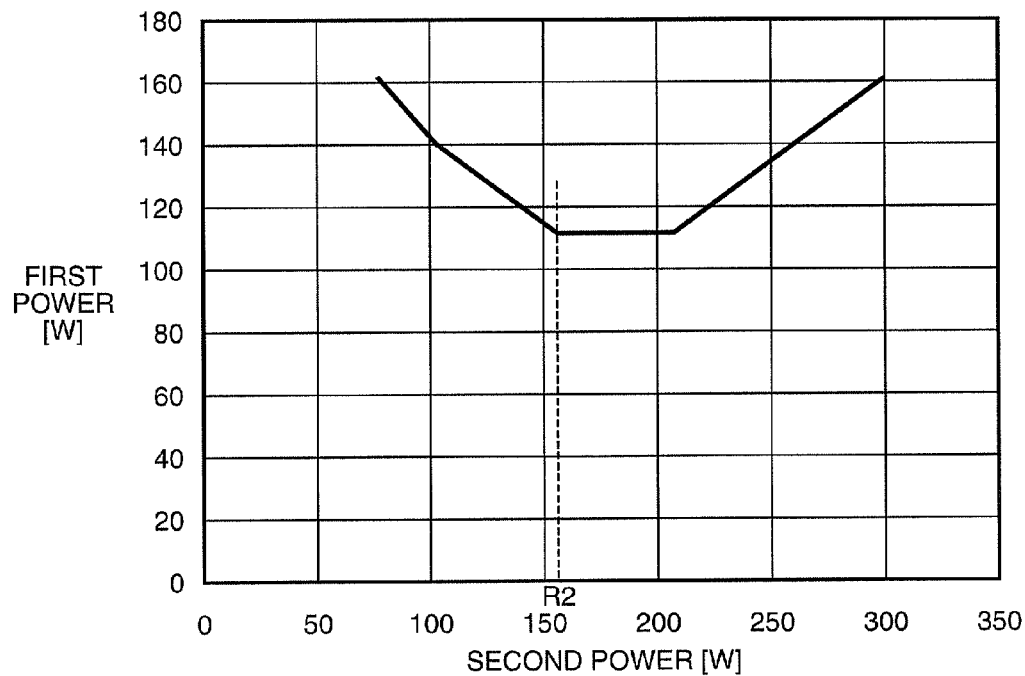
FIGS. 11A and 11B are graphs illustrating a correlation pattern in a second specific example of a control based on the correlation pattern.
Figure 11B:
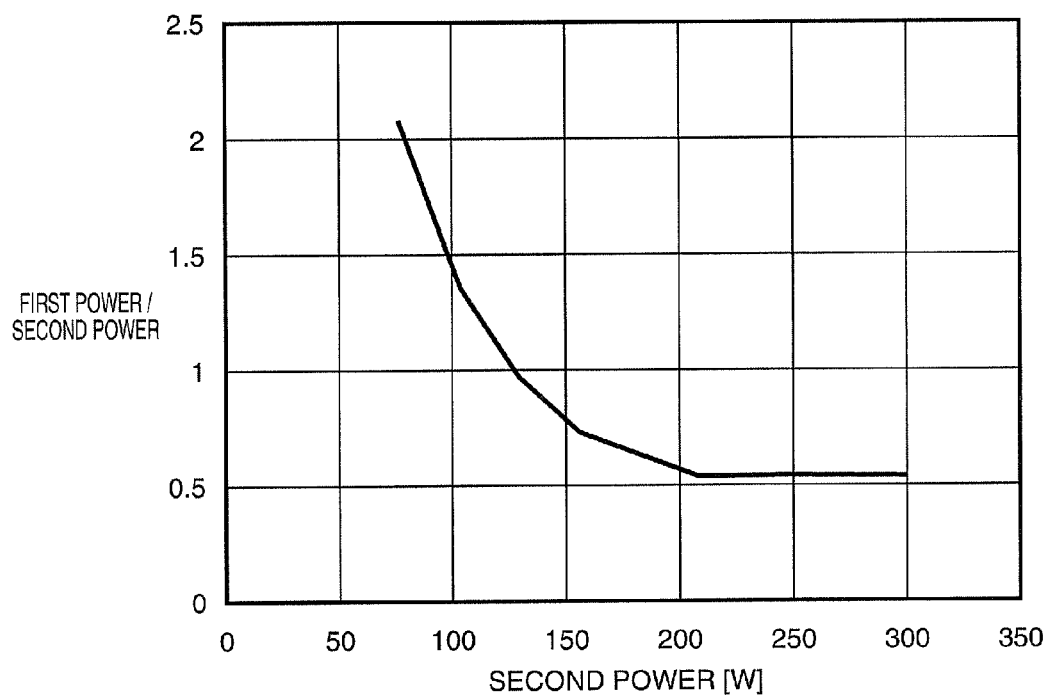

FIGS. 11A and 11B are graphs illustrating the correlation pattern in the second specific example of the control based on the correlation pattern. The horizontal axis in FIG. 11A represents the second power W2, and the vertical axis represents the first power W1. The horizontal axis in FIG. 11B represents the second power W2, and the vertical axis represents the ratio of the first power W1 to the second power W2.

Further, in the example shown in FIGS. 11A and 11B, the correlation pattern between the first power W1 and the second power W2 is a pattern in which as the second power W2 is decreased, the ratio of the first power W1 to the second power W2 is increased. Thus, the same effect as in the first specific example is obtained.

The correlation pattern between the first power W1 and the second power W2 may be a pattern in which the first power W1 is increased as the second power W2 is decreased in a case where the second power W2 is a second reference value R2 or less. In the example shown in FIG. 11A, the correlation pattern between the first power W1 and the second power W2 is a pattern in which the first power W1 is increased as the second power W2 is decreased in a case where the second power W2 is the second reference value R2 or less. Further, in the example shown in FIG. 11A, the second reference value R2 is 156 [W].

According to the second specific example of the control based on the correlation pattern, since the first power W1 is increased as the second power W2 is decreased, it is possible to further suppress the temperature of the discharge lamp 90 from being decreased. Accordingly, it is possible to realize a projector in which the occurrence of flickering is suppressed and the luminance responsiveness is increased.

1-5-5. First Specific Example of Control Based on the State of Deterioration of Discharge Lamp In the first specific example of the control based on the state of deterioration of the discharge lamp 90, as the state of deterioration proceeds, the control section 40 changes the correlation pattern in a case where the second power W2 is a third reference value R3 or less so that the inclination of the first power W1 to the second power W2 is decreased.

Figure 12:
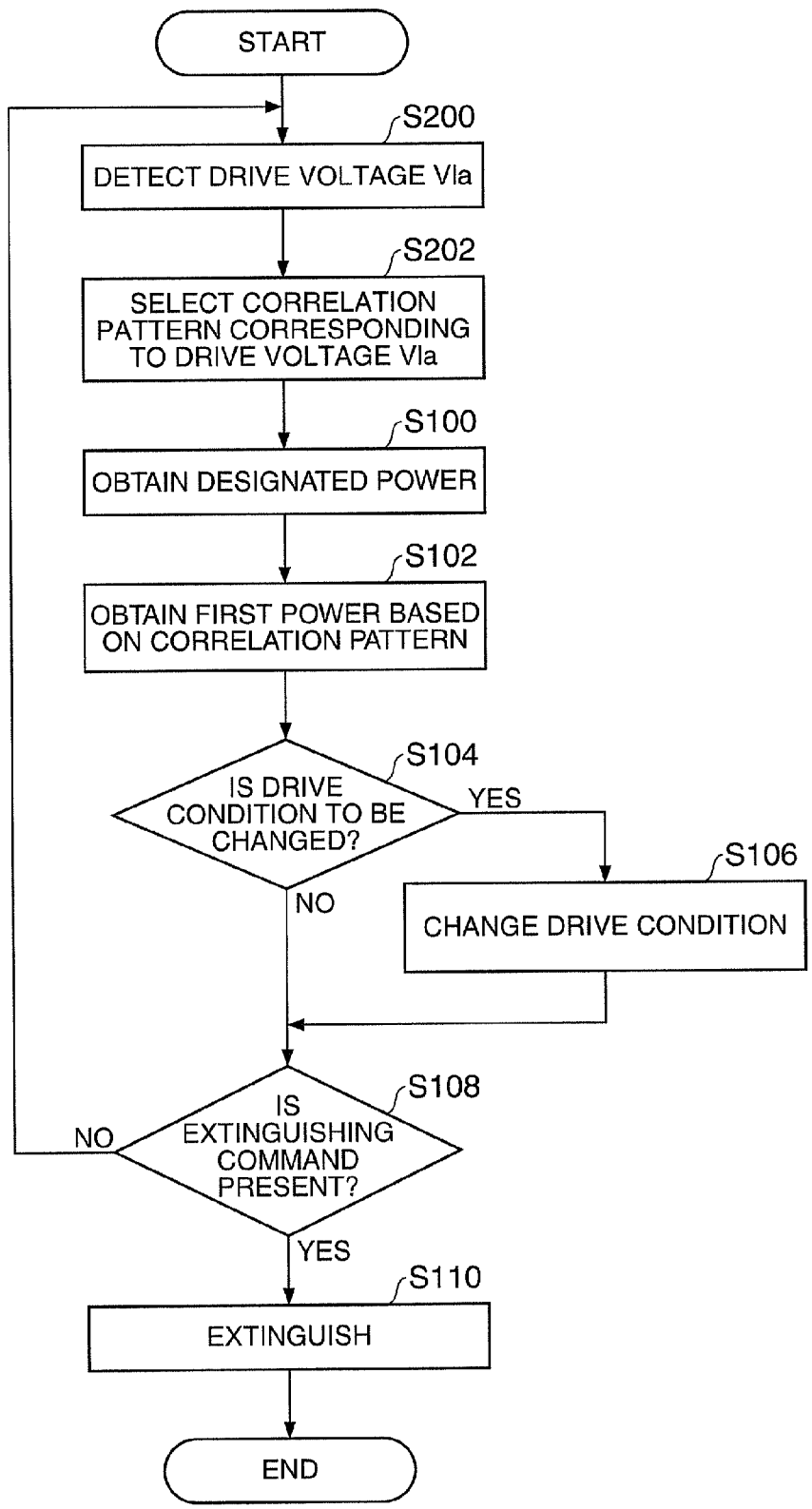
FIG. 12 is a flowchart illustrating another control example of the projector according to the present embodiment.

FIG. 12 is a flowchart illustrating another control example of the projector 500 according to the present embodiment. In the flowchart shown in FIG. 12, a control from the time when the discharge lamp 90 is stably lighted to the time of extinguishing thereof is shown.

The control example shown in FIG. 12 is a control in which steps S200 and S202 are added before step S100, compared with the control example shown in FIG. 9. Accordingly, hereinafter, steps S200 and S202 will be mainly described, and detailed description about the other steps will be omitted.

Further, hereinafter, an example will be described in which the projector 500 includes the voltage detecting section 61 as a state detecting section and detects the drive voltage Vla of the discharge lamp 90 as a value indicating the degree of the state of deterioration of the discharge lamp 90.

Firstly, the voltage detecting section 61 detects the drive voltage Vla (step S200). Then, the control section 40 selects a correlation pattern corresponding to the drive voltage Vla of the discharge lamp 90 detected in step S200 from correlation patterns stored in the storing section 44 (step S202). After step S202, step S100 to step S108 are performed. In a case where it is determined in step S108 that the extinguishing command is present (Yes in step S108), the control section 40 terminates (extinguishes) the lighting of the discharge lamp 90. In a case where it is determined in step S108 that the extinguishing command is not present (No in step S108), the control section 40 repeats the control of step S200 to step S108 until the extinguishing command is present.

Figures 13A, 13B:
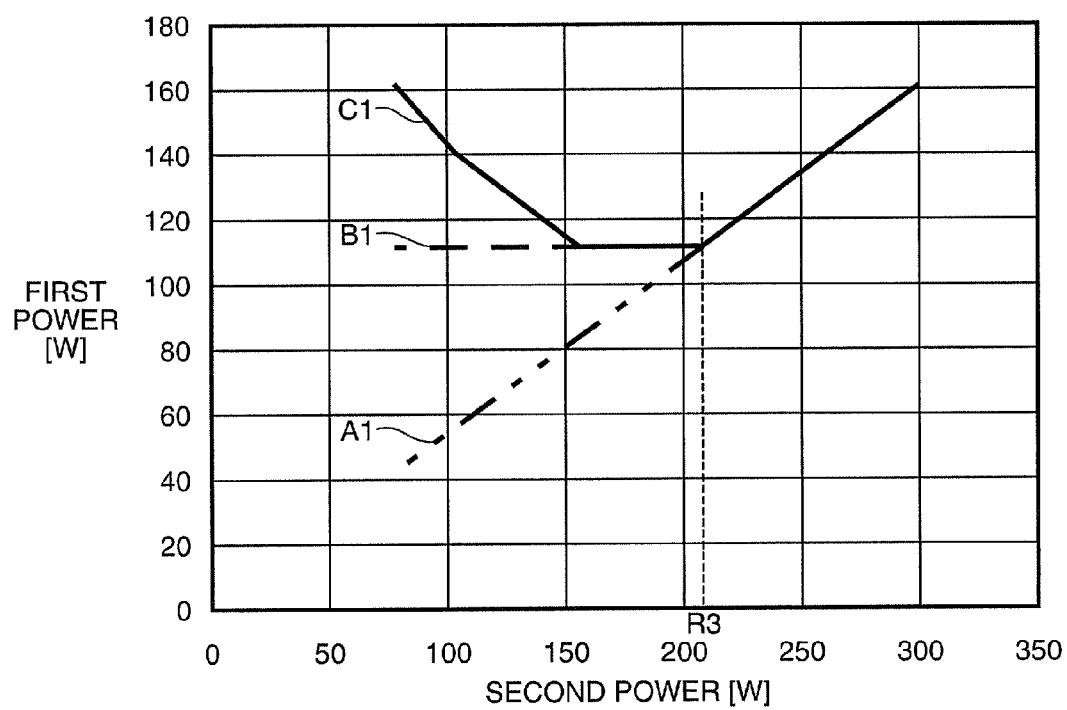
FIG. 13A is a table illustrating the relationship between drive voltage of the discharge lamp and a correlation pattern.
FIG. 13B is a graph illustrating a correlation pattern corresponding to FIG. 13A.

FIG. 13A is a table illustrating the relationship between the drive voltage Vla of the discharge lamp 90 and the correlation pattern, and FIG. 13B is a graph illustrating the correlation pattern corresponding to FIG. 13A. The horizontal axis in FIG. 13B represents the second power W2, and the vertical axis represents the first power W1.

In the example shown in FIG. 13A, three correlation patterns based on the drive voltage Vla are stored in the storing section 44. In FIG. 13B, a correlation pattern A1 (two-dot chain line) in which in a case where the second power W2 is a third reference value R3 or less, the inclination of the first power W1 to the second power W2 becomes positive, a correlation pattern E1 (broken line) in which the inclination of the first power W1 to the second power W2 becomes 0, and a correlation pattern C1 (solid line) in which the inclination of the first power W1 to the second power W2 becomes negative are shown.

In a case where the drive voltage Vla detected in step S200 is less than 85 [V], the control section 40 selects the correlation pattern A1 in step 5202. In a case where the drive voltage Vla detected in step S200 is 85 [V] or more and is less than 100 [V], the control section 40 selects the correlation pattern B1 in step 5202. In a case where the drive voltage Vla detected in step S200 is 100 [V] or more, the control section 40 selects the correlation pattern C1 in step 5202.

Accordingly, in the example shown in FIG. 13A, the correspondence is made so that as the drive voltage Vla is increased (that is, as the state of deterioration of the discharge lamp 90 proceeds), the control section 40 selects the correlation pattern in which the inclination of the first power W1 to the second power W2 is decreased in a case where the second power W2 is the third reference value R3 or less. In the example shown in FIG. 13B, the third reference value R3 is 208 [V].

As the state of deterioration of the discharge lamp 90 proceeds, the flickering easily occurs. As the state of deterioration of the discharge lamp 90 proceeds, by changing the correlation pattern so that the inclination of the first power W1 to the second power W2 is decreased, it is possible to further suppress the temperature of the discharge lamp 90 from being decreased in a case where the state of deterioration of the discharge lamp 90 proceeds. Thus, it is possible to suppress the occurrence of flickering. Further, in a case where the state of deterioration of the discharge lamp 90 does not proceed, it is possible to decrease the first power W1, and thus, it is possible to realize a projector in which the power consumption is suppressed.

1-5-6. Second Specific Example of Control Based on the State of Deterioration of Discharge Lamp In the second specific example of the control based on the state of deterioration of the discharge lamp 90, as the state of deterioration proceeds, the control section 40 changes the first reference value R1 to be large.

The first specific example and the second specific example of the control based on the state of deterioration of discharge lamp 90 are the same in the flowchart of the control from the time when the discharge lamp 90 is stably lighted to the time of extinguishing thereof, as described with reference to FIG. 12, and are different from each other in the correlation pattern between the first power W1 and the second power W2 which can be selected in step S202. Accordingly, hereinafter, the correlation pattern between the first power W1 and the second power W2 which can be selected in step S202 will be mainly described.

Figures 14A, 14B:
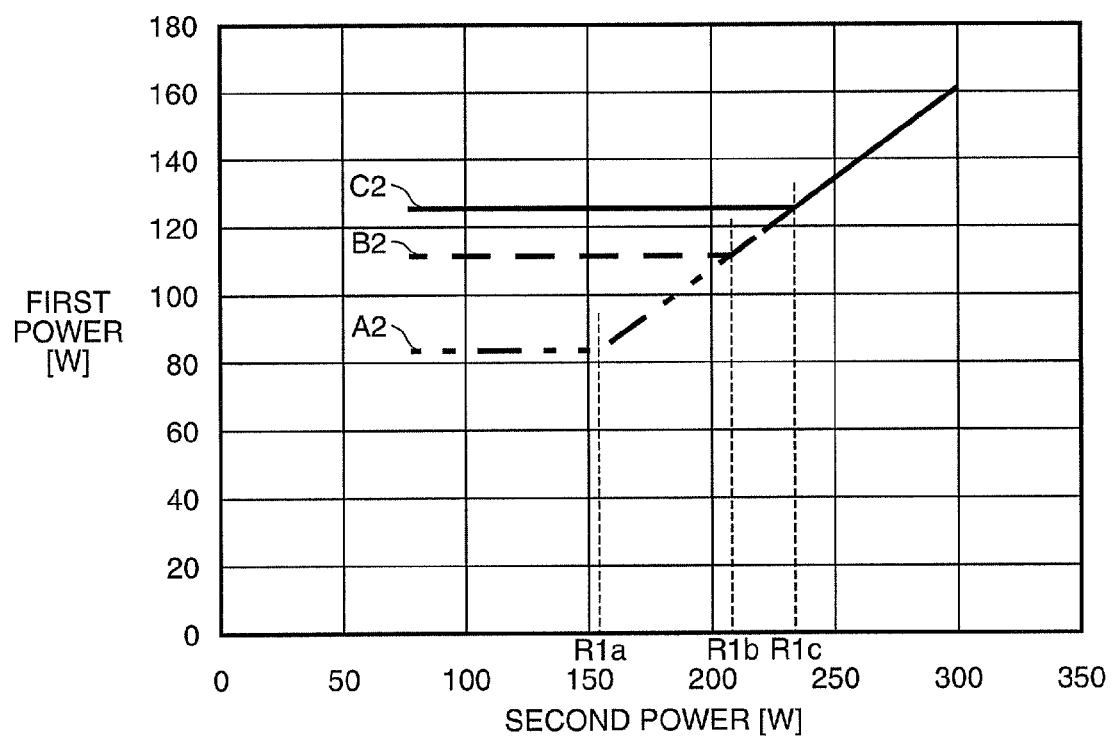
FIG. 14A is a table illustrating the relationship between drive voltage of the discharge lamp and a correlation pattern.
FIG. 14B is a graph illustrating a correlation pattern corresponding to FIG. 14A.

FIG. 14A is a table illustrating the relationship between the drive voltage Vla of the discharge lamp 90 and the correlation pattern, and FIG. 14B is a graph illustrating the correlation pattern corresponding to FIG. 14A. The horizontal axis in FIG. 14B represents the second power W2, and the vertical axis represents the first power W1.

In the example shown in FIG. 14A, three correlation patterns based on the drive voltage Vla are stored in the storing section 44. In FIG. 14B, a correlation pattern A2 (two-dot chain line) in which in a case where the second power W2 is a first reference value R1$a$ or less, the first power W1 becomes a constant value regardless of the second power W2, a correlation pattern B2 (broken line) in which in a case where the second power W2 is a first reference value R1$b$ or less, the first power W1 becomes a constant value regardless of the second power W2, and a correlation pattern C2 (solid line) in which in a case where the second power W2 is a first reference value R1$c$ or less, the first power W1 becomes a constant value regardless of the second power W2, are shown. Here, the relationship of the first reference value R1$a$<the first reference value R1$b$<the first reference value R1$c$ is established. In the example shown in FIG. 14B, the first reference value R1$a$ is 156 [V], the first reference value R1$b$ is 208 [V], and the first reference value R1$c$ is 234 [V].

In a case where the drive voltage Vla detected in step S200 is less than 85 [V], the control section 40 selects the correlation pattern A2 in step S202. In a case where the drive voltage Vla detected in step S200 is 85 [V] or more and is less than 100 [V], the control section 40 selects the correlation pattern B2 in step S202. In a case where the drive voltage Vla detected in step S200 is 100 [V] or more, the control section 40 selects the correlation pattern C2 in step 5202.

Accordingly, in the example shown in FIG. 14A, the correspondence is made so that as the drive voltage Vla is increased (that is, as the state of deterioration of the discharge lamp 90 proceeds), the control section 40 selects the correlation pattern in which the first power R1 is increased.

As the state of deterioration of the discharge lamp 90 proceeds, flickering easily occurs. As the state of deterioration of the discharge lamp 90 proceeds, since the first reference value R1 is increased to increase a lower limit value of the first power W1, it is possible to further suppress the temperature of the discharge lamp 90 from being decreased in a case where the state of deterioration of the discharge lamp 90 proceeds. Thus, it is possible to suppress the occurrence of flickering. Further, since in a case where the state of deterioration of the discharge lamp 90 does not proceed, it is possible to decrease the first power W1, and thus, it is possible to realize a projector in which the power consumption is suppressed.

1-5-7. Third Specific Example of Control Based on the State of Deterioration of Discharge Lamp In the third specific example of the control based on the state of deterioration of the discharge lamp 90, as the state of deterioration proceeds, the control section 40 changes the second reference value R2 to be large.

The first specific example and the third specific example of the control based on the state of deterioration of the discharge lamp 90 are the same in the flowchart of the control from the time when the discharge lamp 90 is stably lighted to the time of extinguishing thereof, as described with reference to FIG. 12, and are different from each other in the correlation pattern between the first power W1 and the second power W2 which can be selected in step S202. Accordingly, hereinafter, the correlation pattern between the first power W1 and the second power W2 which can be selected in step S202 will be mainly described.

Figures 15A, 15B:
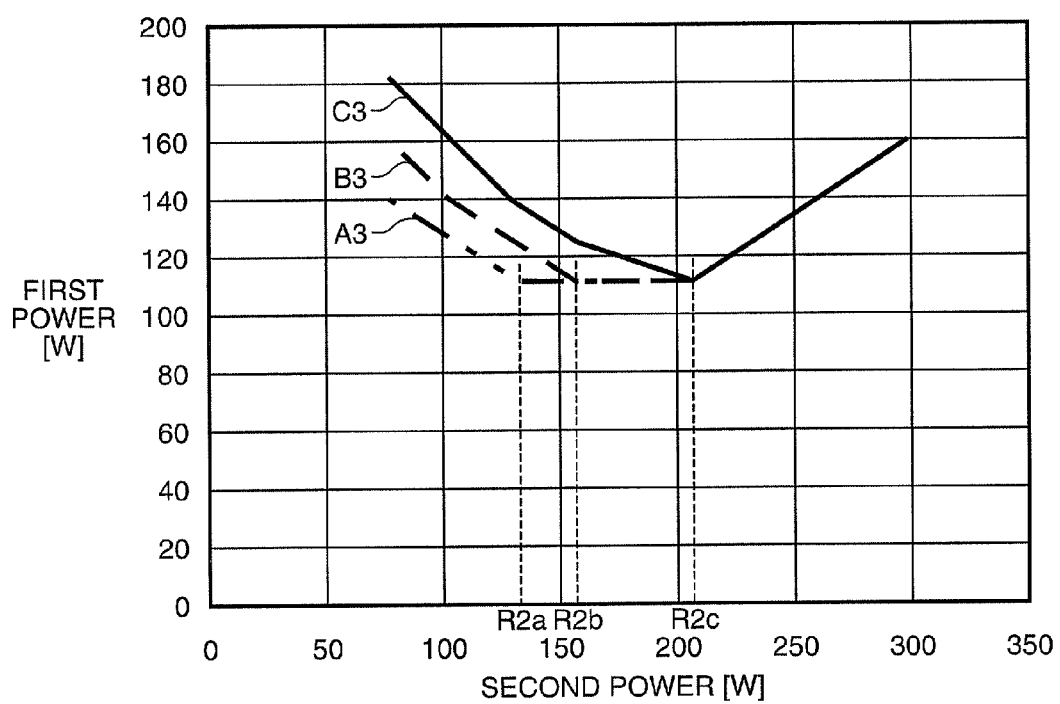
FIG. 15A is a table illustrating the relationship between drive voltage of the discharge lamp and a correlation pattern.

FIG. 15A is a table illustrating the relationship between the drive voltage Vla of the discharge lamp 90 and the correlation pattern, and FIG. 15B is a graph illustrating the correlation pattern corresponding to FIG. 15A. The horizontal axis in FIG. 15B represents the second power W2, and the vertical axis represents the first power W1.

In the example shown in FIG. 15A, three correlation patterns based on the drive voltage Vla are stored in the storing section 44. In FIG. 15B, a correlation pattern A3 (two-dot chain line) in which in a case where the second power W2 is a second reference value R2$a$ or less, as the second power W2 is decreased, the first power W1 is increased, a correlation pattern B3 (broken line) in which in a case where the second power W2 is a second reference value R2$b$ or less, as the second power W2 is decreased, the first power W1 is increased, and a correlation pattern C3 (solid line) in which in a case where the second power W2 is a second reference value R2$c$ or less, as the second power W2 is decreased, the first power W1 is increased, are shown. Here, the relationship of the second reference value R2$a$<the second reference value R2$b$<the second reference value R2$c$ is established. In the example shown in FIG. 15B, the second reference value R2$a$ is 130 [V], the second reference value R2$b$ is 156 [V], and the second reference value R2$c$ is 208 [V].

In a case where the drive voltage Vla detected in step S200 is less than 85 [V], the control section 40 selects the correlation pattern A3 in step S202. In a case where the drive voltage Vla detected in step S200 is 85 [V] or more and is less than 100 [V], the control section 40 selects the correlation pattern B3 in step S202. In a case where the drive voltage Vla detected in step S200 is 100 [V] or more, the control section 40 selects the correlation pattern C3 in step S202.

Accordingly, in the example shown in FIG. 15A, the correspondence is made so that as the drive voltage Vla is increased (that is, as the state of deterioration of the discharge lamp 90 proceeds), the control section 40 selects the correlation pattern in which the second reference value R2 is increased.

As the state of deterioration of the discharge lamp 90 proceeds, the flickering easily occurs. As the state of deterioration of the discharge lamp 90 proceeds, since the second reference value R2 is increased to increase the first power W1 in a case where the second power W2 is decreased, it is possible to further suppress the temperature of the discharge lamp 90 from being decreased in a case where the state of deterioration of the discharge lamp 90 proceeds. Thus, it is possible to suppress the occurrence of flickering. Further, since in a case where the state of deterioration of the discharge lamp 90 does not proceed, it is possible to decrease the first power W1, and thus, it is possible to realize a projector in which the power consumption is suppressed.

1-5-8. Control Example Based on Duration Time

Figure 16:
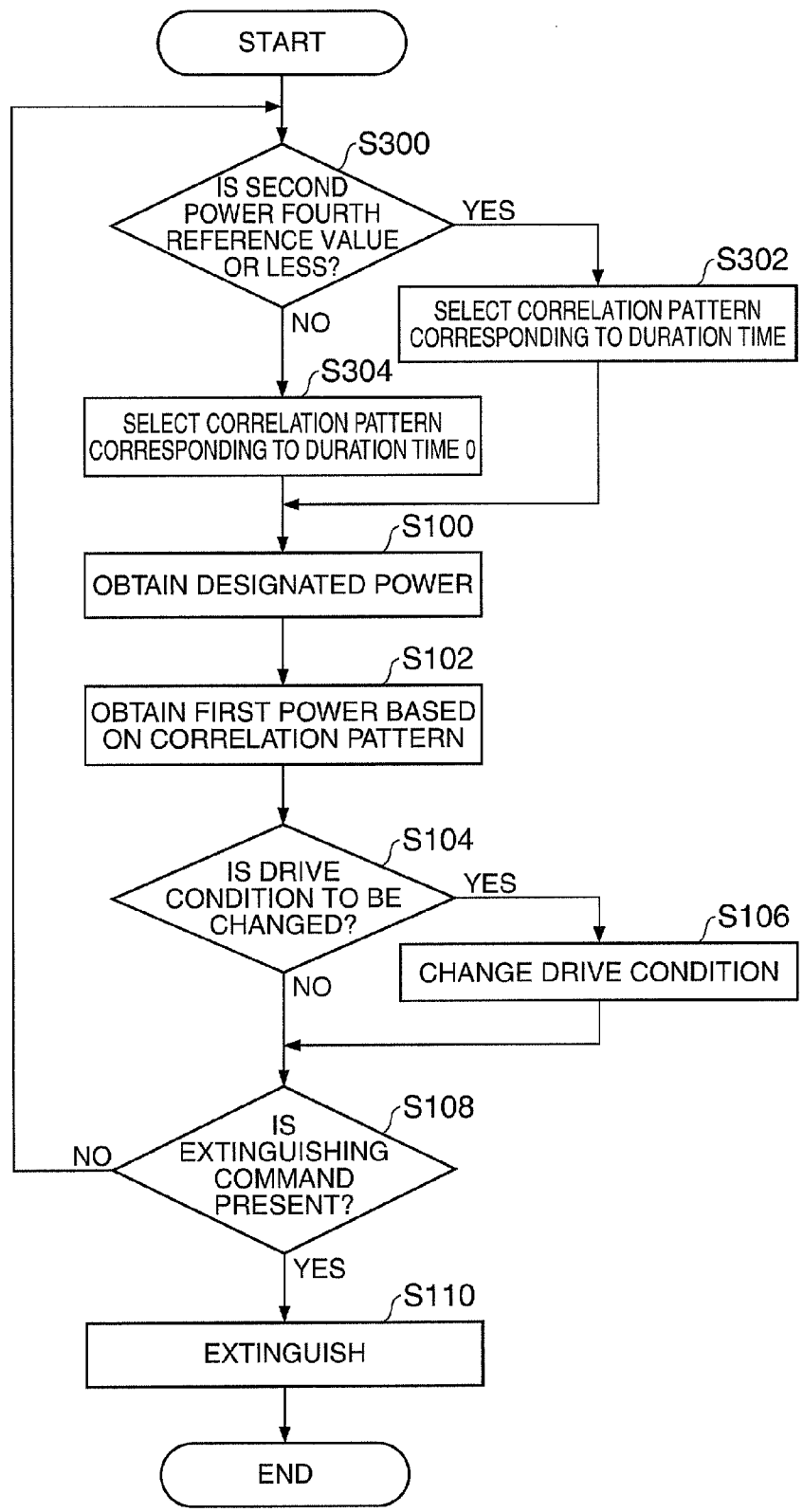
FIG. 16 is a flowchart illustrating still another control example of the projector according to the present embodiment.

FIG. 16 is a flowchart illustrating another control example of the projector 500 according to the present embodiment. In the flowchart shown in FIG. 16, a control from the time when the discharge lamp 90 is stably lighted to the time of extinguishing thereof is shown.

The control example shown in FIG. 16 is a control in which steps S300 to S304 are added before step S100, compared with the control example shown in FIG. 9. Accordingly, hereinafter, steps S300 to S304 will be mainly described, and detailed description about the other steps will be omitted.

Firstly, the control section 40 determines whether the second power W2 is a fourth reference value R4 or less (step S300). In a case where it is determined that the second power W2 is the fourth reference value R4 or less (Yes in step S300), the control section 40 selects a correlation pattern corresponding to a time when the second power W2 is continued with the fourth reference value R4 or less (step S302). In a case where it is determined that the second power W2 is not the fourth reference value R4 or less (No in step S300), the control section 40 selects a correlation pattern corresponding to a case where the time when the second power W2 is continued with the fourth reference value R4 or less is 0 (step S304). Step S100 to step S108 are performed after step S302 and step S304. In a case where it is determined in step S108 that the extinguishing command is present (Yes in step S108), the control section 40 terminates (extinguishes) the lighting of the discharge lamp 90. In a case where it is determined in step S108 that the extinguishing command is not present (No in step S108), the control section 40 repeats the control of S300 to step S108 until the extinguishing command is present.

As the time when the second power W2 is continued with the fourth reference value R4 or less is increased, the control section 40 may change the correlation pattern in a case where the second power W2 is less than the third reference value R3 so that the inclination of the first power W1 to the second power W2 is decreased.

As the time when the second power W2 is continued with the fourth reference value R4 or less is increased, the control section 40 may change the first reference value R1 or the second reference value R2 to be large.

FIGS. 17A to 17C are tables illustrating the correspondence between the time when the second power W2 is continued with the fourth reference value R4 or less and the correlation pattern. In the example shown in FIGS. 17A to 17C, three correlation patterns based on the time when the second power W2 is continued with the fourth reference value R4 or less are respectively stored in the storing section 44. The correlation patterns A1, A2, A3, B1, B2, B3, C1, C2 and C3 are the correlation patterns described with reference to FIGS. 13B, 14B and 15B.

In a case where any one of FIGS. 17A to 17C is used, since the operation in step S302 is the same, FIG. 17A will be described as an example, hereinafter.

In a case where the time when the second power W2 is continued with the fourth reference value R4 or less is less than 1 minute, the control section 40 selects the correlation pattern A1 in step S302. In a case where the time when the second power W2 is continued with the fourth reference value R4 or less is 1 minute or more and is less than 5 minutes, the control section 40 selects the correlation pattern B1 in step S302. In a case where the time when the second power W2 is continued with the fourth reference value R4 or less is 5 minutes or more, the control section 40 selects the correlation pattern C3 in step S302.

As a state where the temperature of the discharge lamp 90 is low is continued for a long time, the luminance responsiveness of the discharge lamp 90 is deteriorated. As the time when the second power W2 is continued with the fourth reference value R4 or less is increased, by changing the correlation pattern so that the inclination of the first power W1 to the second power W2 is decreased, it is possible to suppress the state where the temperature of the discharge lamp 90 is low from being continued for a long time. Accordingly, it is possible to realize a projector in which the luminance responsiveness is increased. Further, in a case where the time when the second power W2 is continued with the fourth reference value R4 or less is short, it is possible to decrease the first power W1, and thus, it is possible to realize a projector in which the power consumption is suppressed.

Similarly, as the time when the second power W2 is continued with the fourth reference value R4 or less is increased, by changing the first reference value R1 or the second reference value R2 to be large, it is possible to suppress the state where the temperature of the discharge lamp 90 is low from being continued for a long time. Accordingly, it is possible to realize a projector in which the luminance responsiveness is increased. Further, in a case where the time when the second power W2 is continued with the fourth reference value R4 or less is short, it is possible to decrease the first power W1, and thus, it is possible to realize a projector in which power consumption is suppressed.

1-5-9. Another Control Example

Figure 18A:
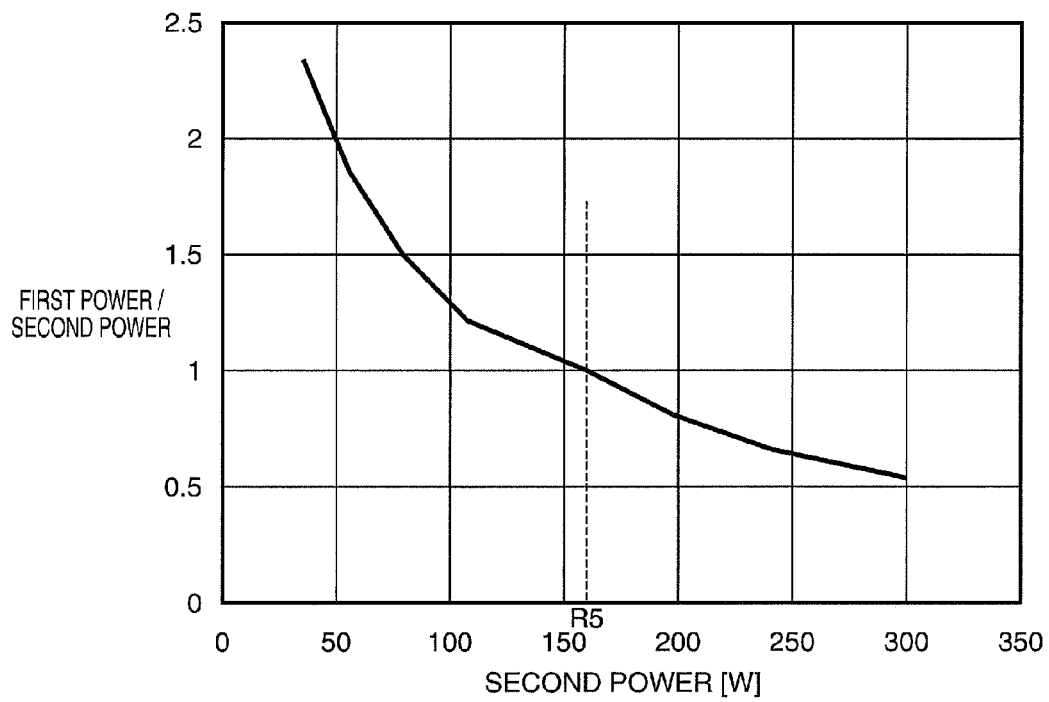
FIG. 18A is a graph illustrating a correlation pattern in another control example.
Figure 18B:
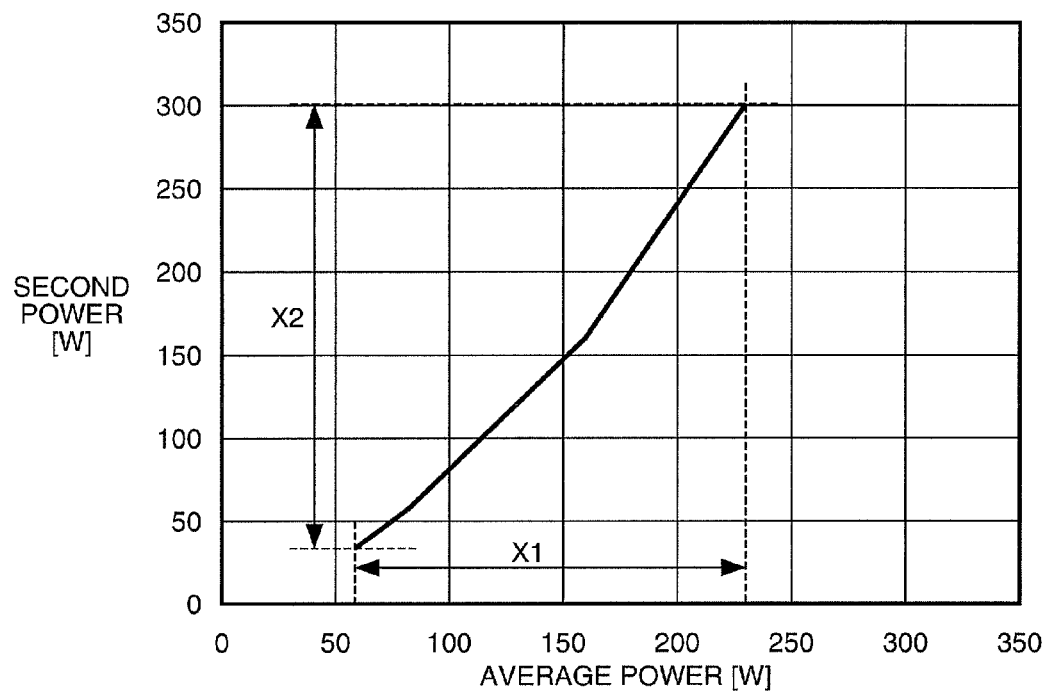
FIG. 18B is a graph illustrating the relationship between an average power and the second power in the correlation pattern shown in FIG. 18A.

FIG. 18A is a graph illustrating a correlation pattern in another control example, and FIG. 18B is a graph illustrating the relationship between an average power and the second power W2 in the correlation pattern shown in FIG. 18A. The horizontal axis in FIG. 18A represents the second power W2, and the vertical axis represents the ratio of the first power W1 to the second power W2. The horizontal axis in FIG. 18B represents an average power over the first period and the second period, and the vertical axis represents the second power W2.

The correlation pattern shown in FIG. 18A is a pattern in which as the second electric power W2 is decreased, the ratio of the first electric power W1 to the second electric power W2 is increased. That is, the correlation pattern shown in FIG. 18A is a pattern in which as the second electric power W2 is decreased, the ratio of the second electric power W2 to the average power over the first period and the second period is decreased, and the ratio of the first power W1 to the average power is increased.

The range of electric power which can be used for the discharge lamp 90 is determined by the average power over the first period and the second period. In the example shown in FIG. 18B, a range X1 of electric power which can be used for the discharge lamp 90 is the range of 60 [W] or more and 230 [W] or less. On the other hand, in the correlation pattern shown in FIG. 18A, a range X2 which the second power W2 can have is the range of 36 [W] or more and 300 [W] or less.

In this way, by setting the correlation pattern to a pattern in which the ratio of the first power W1 to the second power W2 is increased as the second power W2 is decreased, it is possible to enlarge the range which the second power W2 can have. Accordingly, it is possible to realize a projector which is capable of increasing the difference between the maximum luminance and the minimum luminance.

Further, in a case where the second power W2 is a fifth reference value R5 or less, the correlation pattern may be a pattern in which the second power W2 is smaller than the first power W1. In the example shown in FIG. 18A, in a case where the second power W2 is the fifth reference value R5 or less, the ratio of the first power W1 to the second power W2 is 1 or more. That is, in a case where the second power W2 is the fifth reference value R5 or less, the second power W2 is smaller than the first power W1.

With such a correlation pattern, since the second power W2 can be smaller than the average power over the lighting period of the discharge lamp 90, it is possible to project a darker image. Accordingly, it is possible to realize a projector capable of increasing the difference between the maximum luminance and the minimum luminance.

2. First Modification Example of Projector 500 According to the Present Embodiment Next, a modification example of the projector 500 according to the present embodiment will be described. In the above-described embodiment, a transmission type projector has been described, but the invention is not limited thereto and may be applied to a reflection type projector. Here, the "transmission type" means a type in which an electro-optic modulation device as optical modulation means transmits light, such as a transmission type liquid crystal panel, and the "reflection type" means a type in which an electro-optic modulation device as optical modulation means reflects light, such as a reflection type liquid crystal panel or a micromirror type optical modulation device. As the micromirror type optical modulation device, for example, DMD (digital micromirror device, trademark of Texas Instruments Inc.) may be used. In a case where the invention is applied to the reflection type projector, it is possible to achieve the same effect as in the transmission type projector. Hereinafter, an example in which the projector 500 is a reflection type projector using DMD will be described.

2-1. First Period, Second Period and Switching Period

Figure 19:
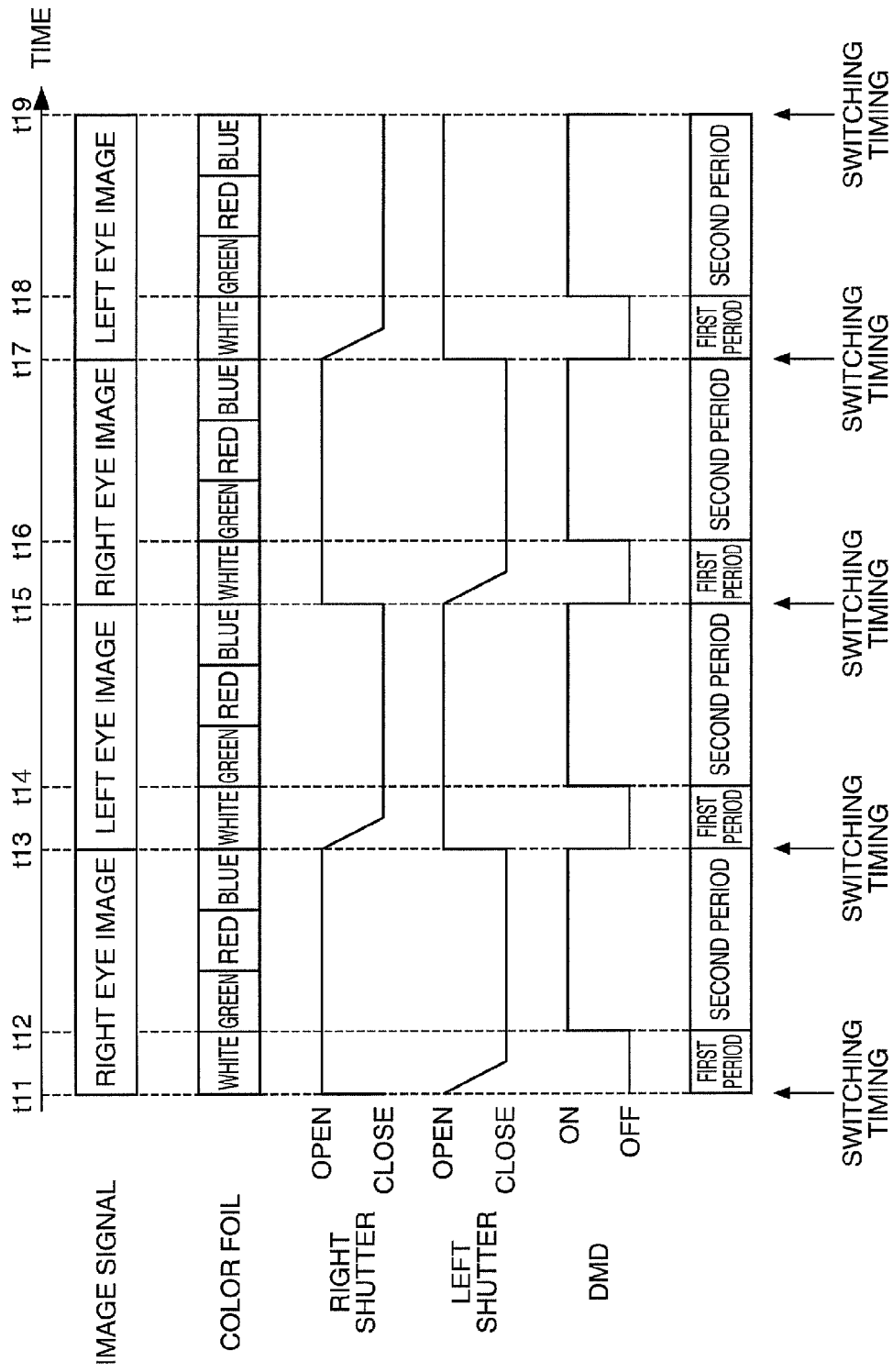
FIG. 19 is a diagram illustrating a first period, a second period and a switching timing.

FIG. 19 is a diagram illustrating a first period, a second period and a switching timing. In FIG. 19, content of the image signal 502, color of a color foil, the opened and closed state of the right shutter 412, the opened and closed state of the left shutter 414, the ON/OFF state of DMD, and the temporal relationship between the first period, the second period and the switching timing are shown sequentially from the top. In FIG. 19, the horizontal axis represents time. Hereinafter, an example in which an observer stereoscopically views a display image using a first image and a second image as a left eye image and a right eye image, respectively, will be described.

In the example shown in FIG. 19, the image signal 502 is a drive signal corresponding to the right eye image as the first image from a time t11 to a time t13, the left eye image as the second image from the time t13 to a time t15, the right eye image as the first image from the time t15 to a time t17, and the left eye image as the second image from the time t17 to a time t19. Accordingly, in the example shown in FIG. 19, the projector 500 switches and alternately outputs the right eye image as the first image and the left eye image as the second image, using the time t11, the time t13, the time t15, the time t17 and the time t19 as switching timings.

A period interposed between the switching timings which are temporally adjacent to each other starts in the first period and ends in the second period. In the example shown in FIG. 19, for example, a period interposed between the time t11 and the time t13 which are the switching timings starts in a first period from the time t11 to a time t12 and ends in a second period from the time t12 to the time t13. This is similarly applied to a period interposed between the time t13 and the time t15 which are the switching timings, a period interposed between the time t15 and the time t17 which are the switching timings, and a period interposed between the time t17 and the time t19 which are the switching timings.

In the example shown in FIG. 19, a period when the color foil is white corresponds to the first period, and a period when the color foil is green, red and blue corresponds to the second period. Further, DMD is in an OFF state in the first period and is in an ON state in the second period.

The right shutter 412 enters the opened state in at least apart of the period when the right eye image as the first image is projected. In the example shown in FIG. 19, the right shutter 412 is in the opened state from the time t11 to the time t13 and from the time t15 to the time 17.

The left shutter 414 enters the opened state in at least apart of the period when the left eye image as the second image is projected. In the example shown in FIG. 19, the left shutter 414 is in the opened state from the time t13 to the time t15 and from the time t17 to the time t19.

2-2. Waveform Example of Electric Current I Supplied to Discharge Lamp 90 and Control Example of Electric Power The waveform example of the electric current I and the control example of the electric power described from "1-5-2. Waveform example of electric current I supplied to discharge lamp 90" to "1-5-9. Another control example" can be applied herein, and thus, the same effect is achieved.

3. Second Modification Example of Projector 500 According to the Present Embodiment The projector 500 is a projector 500 which repeats the first period when the first image is output and the second period when the second image is output. Here, the first image corresponds to black. The control section 40 controls the discharge lamp drive section 230 to supply the first power W1 to the discharge lamp 90 in the first period, and controls the discharge lamp drive section 230 to supply the second power W2 to the discharge lamp 90 in the second period, on the basis of the correlation pattern which is a pattern indicating the correlation between the first power W1 and the second power W2. The correlation pattern may be a pattern in which as the second power W2 is decreased, the ratio of the first power Ni to the second power W2 is increased.

Figure 20A:
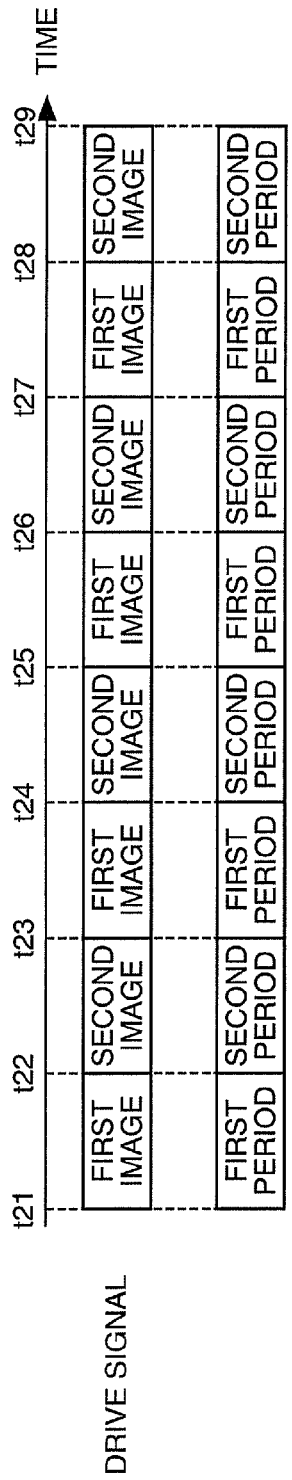
FIGS. 20A and 20B are diagrams illustrating the first period and the second period.
Figure 20B:
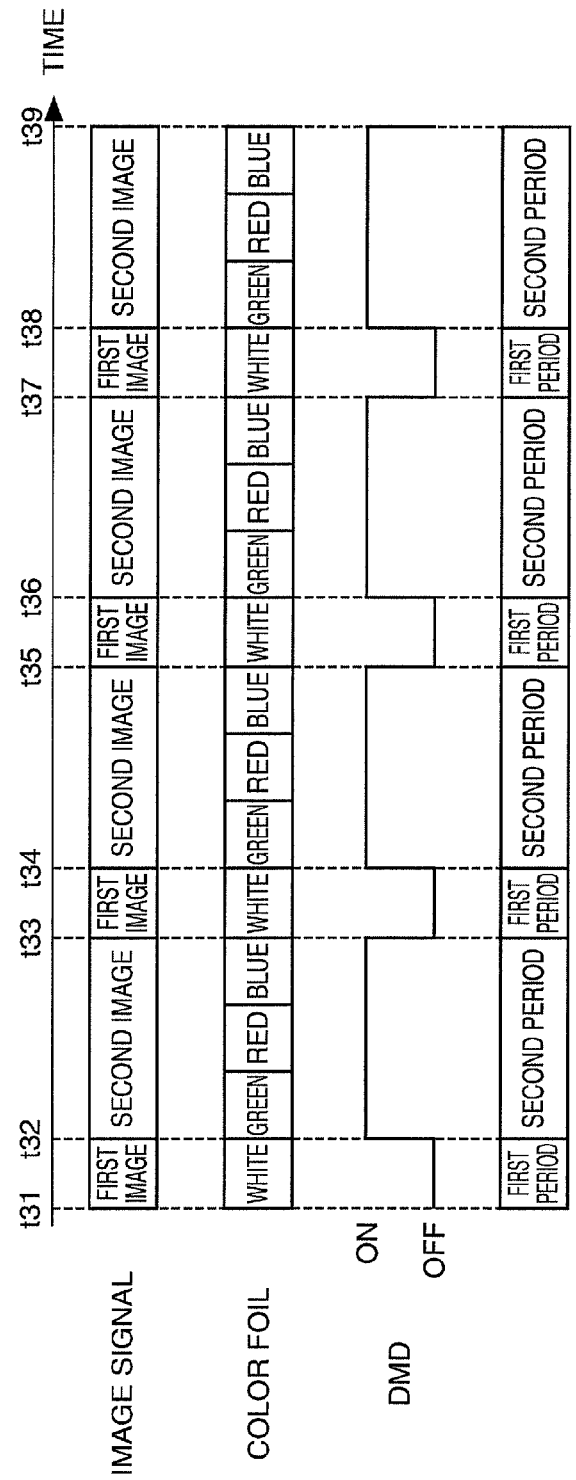

FIGS. 20A and 20B are diagrams illustrating the first period and the second period. In FIG. 20A, the content of the drive signals 572R, 572G and 572B and the temporal relationship between the first period and the second period are shown sequentially from the top. In FIG. 20B, the content of the image signal 502, the color of the color foil, the ON/OFF state of DMD, and the temporal relationship between the first period and the second period are shown sequentially from the top. The horizontal axis in FIGS. 20A and 20B represents time.

In the example shown in FIG. 20A, a period when the drive signals 572R, 572G and 572B correspond to the first image is the first period, and a period when the drive signals 572R, 572G and 572B correspond to the second image is the second period. The projector 500 controls the liquid crystal light valves 330R, 330G and 330B in a non-transmission state in the first period, for example, to thereby project the first image corresponding to black.

In the example shown in FIG. 20B, a period when the image signal 502 corresponds to the first image is the first period, and a period when the image signal 502 corresponds to the second image is the second period. In the example shown in FIG. 20B, in the first period, the color of the color foil is white, and DMD is in the OFF state. Further, in the second period, the color of the color foil is any one of green, red, and blue, and DMD is in the ON state. That is, the projector 500 controls DMD to be in the OFF state in the first period, for example, to thereby project the first image corresponding to black.

In this case, the waveform example of the electric current I and the control example of the electric power described from "1-5-2. Waveform example of electric current I supplied to discharge lamp 90" to "1-5-9. Another control example" can be applied herein, and thus, the same effect is achieved.

In each embodiment described in "1. Projector according to the present embodiment" and "2. First modification example of projector 500 according to the present embodiment", the projector 500 has a configuration in which the display image is stereoscopically shown to the observer using the first image and the second image as the left eye image and the right eye image, respectively, but is not limited thereto. For example, as the projector 500, a configuration may be employed in which the first image and the second image are displayed as images having different content and two display images (the first image and the second image) are visually shown to different observers, respectively.

In such a configuration, as the active shutter glasses 410, two types of glasses each of which has a shutter which is operated in a similar way to the above-mentioned right shutter 412 is installed on the left and right sides and a shutter which is operated in a similar way to the above-mentioned left shutter 414 is installed on the left and right sides may be used.

In each embodiment as described above, the projector which uses three liquid crystal panels has been described as an example, but the invention is not limited thereto and may be applied to a projector which uses one, two, four or more liquid crystal panels.

The invention may be applied to the case of a front projection type projector which projects a projection image from the side of observation, and may be applied to the case of a rear projection type projector which projects the projection image from the side opposite to the side of observation.

In each embodiment as described above, in the period of ½ cycle of polarity inversion of the electric current I, the absolute value of the electric current I becomes constant. That is, the waveform of the electric current I is a so-called square waveform. The waveform of the electric current I is not limited thereto, and may be a waveform in which the absolute value of the electric current I uses different values in the period of one cycle of the polarity inversion of the electric current I such as a waveform which starts in a period when the absolute value of the electric current I becomes a first electric current value and ends in a period when the absolute value of the electric current I becomes a second electric current value larger than the first electric current value in the period of half cycle of the polarity inversion of the electric current I, or a waveform in which the absolute value of the electric current I is monotonically increased in the period of the half cycle of the polarity inversion of the electric current I.

The invention is not limited to the above-described embodiments, and various modifications may be made in the range of the spirit of the invention.

The invention includes a configuration which is substantially the same as the configuration described in the embodiments (for example, a configuration in which functions, ways and results are the same, or a configuration in which objects and effects are the same). Further, the invention includes a configuration in which parts which are not essential in the configuration described in the embodiment are replaced. Further, the invention includes a configuration having the same operations and effects as in the configuration described in the embodiment, or a configuration capable of achieving the same object as in the configuration described in the embodiment. Further, the invention includes a configuration in which known techniques are added to the configuration described in the embodiment.

The entire disclosure of Japanese Patent Application No. 2011-221967, filed Oct. 6, 2011 is expressly incorporated by reference herein.

What is claimed is:

1. A projector which switches and alternately outputs a first image and a second image at a predetermined timing, comprising:
   a discharge lamp;
   a discharge lamp drive section that supplies an electric power for driving the discharge lamp to the discharge lamp; and
   a control section that controls the discharge lamp drive section,
   wherein a period interposed between the switching timings which are temporally adjacent to each other starts in a first period and ends in a second period,
   wherein the control section controls, on the basis of a correlation pattern which is a pattern indicating the correlation between a first electric power and a second electric power, the discharge lamp drive section to supply the first electric power to the discharge lamp in the first period and to supply the second electric power to the discharge lamp in the second period, and
   wherein the correlation pattern includes a pattern in which as the second electric power is decreased, the ratio of the first electric power to the second electric power is increased.

2. The projector according to claim 1,
   wherein the correlation pattern includes a pattern in which in a case where the second electric power is a first reference value or less, the first electric power is a constant value regardless of the second electric power.

3. The projector according to claim 2, further comprising:
   a state detecting section that detects a state of deterioration of the discharge lamp,
   wherein as the state of deterioration proceeds, the control section increases the first reference value.

4. The projector according to claim 1,
   wherein the correlation pattern includes a pattern in which in a case where the second electric power is a second reference value or less, as the second electric power is decreased, the first electric power is increased.

5. The projector according to claim 4, further comprising:
   a state detecting section that detects a state of deterioration of the discharge lamp,
   wherein as the state of deterioration proceeds, the control section increases the second reference value.

6. The projector according to claim 1, further comprising:
   a state detecting section that detects the state of deterioration of the discharge lamp, wherein as the state of deterioration proceeds, the control section changes the correlation pattern in a case where the second electric power is a third reference value or less so that the inclination of the first electric power to the second electric power is decreased.

7. The projector according to claim 1,
wherein as the time when the second electric power is continued with a fourth reference value or less becomes long, the control section changes the correlation pattern in a case where the second electric power is less than a third reference value so that the inclination of the first electric power to the second electric power is decreased.

8. The projector according to claim 1,
wherein the correlation pattern includes a pattern in which in a case where the second electric power is a fifth reference value or less, the second electric power is smaller than the first electric power.

9. A projector which repeats a first period when a first image is output and a second period when a second image is output, comprising:
a discharge lamp;
a discharge lamp drive section that supplies an electric power for driving the discharge lamp to the discharge lamp; and
a control section that controls the discharge lamp drive section,
wherein the first image is an image corresponding to black,
wherein the control section controls, on the basis of a correlation pattern which is a pattern indicating the correlation between a first electric power and a second electric power, the discharge lamp drive section to supply the first electric power to the discharge lamp in the first period and to supply the second electric power to the discharge lamp in the second period, and
wherein the correlation pattern includes a pattern in which as the second electric power is decreased, the ratio of the first electric power to the second electric power is increased.

10. The projector according to claim 1,
wherein the second electric power is based on at least one of information relating to luminance corresponding to an image signal and information relating to brightness of a projected image.

* * * * *